United States Patent
Kaushik et al.

(10) Patent No.: US 12,204,416 B2
(45) Date of Patent: Jan. 21, 2025

(54) METHODS AND SYSTEMS TO REDUCE LATENCY OF INPUT/OUTPUT (I/O) OPERATIONS DURING CREATION OF COMMON SNAPSHOTS BASED ON BATCHING OF SYNCHRONOUS REPLICATED DATASETS AT A PRIMARY STORAGE SYSTEM TO A CROSS-SITE SECONDARY STORAGE SYSTEM

(71) Applicant: NetApp, Inc., San Jose, CA (US)

(72) Inventors: Akhil Kaushik, San Jose, CA (US); Dhruvil Shah, Bangalore (IN); Arun Kumar Selvam, Tamilnadu (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/148,696

(22) Filed: Dec. 30, 2022

(65) Prior Publication Data
US 2024/0143453 A1  May 2, 2024

(30) Foreign Application Priority Data
Oct. 28, 2022 (IN) .............................. 202241061494

(51) Int. Cl.
G06F 11/00 (2006.01)
G06F 3/06 (2006.01)
(Continued)

(52) U.S. Cl.
CPC ........ *G06F 11/1466* (2013.01); *G06F 3/0611* (2013.01); *G06F 3/064* (2013.01);
(Continued)

(58) Field of Classification Search
CPC ............. G06F 11/1466; G06F 11/1451; G06F 2201/84
(Continued)

(56) References Cited

U.S. PATENT DOCUMENTS 5,515,502 A * 5/1996 Wood .................. G06F 11/1461
714/E11.12
7,653,612 B1 1/2010 Veeraswamy et al.
(Continued)

FOREIGN PATENT DOCUMENTS

CN 109218177 B 6/2021

OTHER PUBLICATIONS

Co-pending U.S. Appl. No. 18/148,644, inventors Akhil; Kaushik et al., filed on Dec. 30, 2022.
(Continued)

*Primary Examiner* — Chae M Ko
(74) *Attorney, Agent, or Firm* — Jaffery Watson Hamilton & DeSanctis LLP

(57) ABSTRACT

Multi-site distributed storage systems and computer-implemented methods are described for improving a resumption time of input/output (I/O) operations during a common snapshot procedure for storage objects. A computer-implemented method includes initiating a snapshot multi create operation to selectively form a batch of first and second synchronous replicated datasets that belong to a first group of storage disks at the primary storage site and corresponding second group of storage disks at the secondary storage site, performing a batch snapshot create operation on the primary storage site by executing snapshots of storage objects on the primary storage site of the batch of first and second synchronous replicated datasets in parallel multiple threads to effectively utilize processing resources on the primary storage site, and initiating an independent workflow and state machine for each storage object of the batch of first and second synchronous replicated datasets.

20 Claims, 16 Drawing Sheets

(51) Int. Cl.
  *G06F 11/14* (2006.01)
  *G06F 16/11* (2019.01)
  *G06F 16/178* (2019.01)

(52) U.S. Cl.
  CPC .......... *G06F 3/067* (2013.01); *G06F 11/1448* (2013.01); *G06F 11/1451* (2013.01); *G06F 16/128* (2019.01); *G06F 16/178* (2019.01); *G06F 2201/84* (2013.01)

(58) Field of Classification Search
  USPC .......................................................... 714/6.3
  See application file for complete search history.

(56) References Cited

U.S. PATENT DOCUMENTS

| | | | |
|---|---|---|---|
| 8,095,657 | B2 | 1/2012 | E et al. |
| 8,498,967 | B1 | 7/2013 | Chatterjee et al. |
| 9,772,908 | B1* | 9/2017 | Gupta ................. G06F 11/1461 |
| 10,326,689 | B2 | 6/2019 | Liu et al. |
| 10,949,309 | B2 | 3/2021 | Hajare et al. |
| 11,089,105 | B1* | 8/2021 | Karumbunathan ... G06F 16/275 |
| 11,132,339 | B2 | 9/2021 | Kaushik et al. |
| 11,226,678 | B2 | 1/2022 | Stolzenberg et al. |
| 11,226,878 | B1 | 1/2022 | Beier et al. |
| 11,995,041 | B2 | 5/2024 | Kaushik et al. |
| 2003/0182312 | A1 | 9/2003 | Chen et al. |
| 2007/0253329 | A1 | 11/2007 | Rooholamini et al. |
| 2012/0265910 | A1 | 10/2012 | Galles et al. |
| 2013/0254599 | A1 | 9/2013 | Katkar et al. |
| 2014/0189270 | A1 | 7/2014 | Iwanicki et al. |
| 2016/0105313 | A1 | 4/2016 | Jha et al. |
| 2018/0095852 | A1 | 4/2018 | Keremane et al. |
| 2018/0260125 | A1 | 9/2018 | Botes et al. |
| 2019/0342338 | A1 | 11/2019 | Anandam et al. |
| 2020/0112628 | A1 | 4/2020 | Barszczak et al. |
| 2020/0133798 | A1 | 4/2020 | Hu et al. |
| 2020/0152027 | A1 | 5/2020 | Blaser et al. |
| 2020/0159625 | A1 | 5/2020 | Hutcheson et al. |
| 2020/0409810 | A1 | 12/2020 | Wu et al. |
| 2021/0019229 | A1 | 1/2021 | Kucherov et al. |
| 2022/0027311 | A1* | 1/2022 | Hu ....................... G06F 16/128 |
| 2022/0086237 | A1 | 3/2022 | Devireddy et al. |
| 2022/0189615 | A1 | 6/2022 | Yu et al. |
| 2023/0012563 | A1 | 1/2023 | Patnaik et al. |
| 2023/0289443 | A1 | 9/2023 | Sinha et al. |
| 2024/0036732 | A1 | 2/2024 | Vijayan et al. |
| 2024/0036997 | A1 | 2/2024 | Vijayan et al. |
| 2024/0296100 | A1 | 9/2024 | Kaushik et al. |

OTHER PUBLICATIONS

Co-pending U.S. Appl. No. 18/148,705, inventors Akhil; Kaushik et al., filed on Dec. 30, 2022.

Non-Final Office Action mailed on Dec. 28, 2023 for U.S. Appl. No. 18/148,705, filed Dec. 30, 2022, 17 pages.

Dawgsfan., "High Availability—HA Heartbeat Backup", by Dawgs Fan, Almargaris, 2022, at Palo Alto Networks—https://live.paloaltonetworks.com/t5/best-practice-assessment-device/high-availability-ha-heartbeat-backup/ta-p/338210.

Non-Final Office Action mailed on Dec. 11, 2023 for U.S. Appl. No. 17/875,814, filed Jul. 28, 2022, 24 pages.

Non-Final Office Action mailed on Oct. 3, 2023 for U.S. Appl. No. 17/875,849, filed Jul. 28, 2022, 06 pages.

Notice of Allowance mailed on Apr. 12, 2024 for U.S. Appl. No. 18/148,705, filed Dec. 30, 2022, 07 pages.

Non-Final Office Action mailed on Jul. 2, 2024 for U.S. Appl. No. 18/148,644, filed Dec. 30, 2022, 8 pages.

* cited by examiner

METHODS AND SYSTEMS TO REDUCE LATENCY OF INPUT/OUTPUT (I/O) OPERATIONS DURING CREATION OF COMMON SNAPSHOTS BASED ON BATCHING OF SYNCHRONOUS REPLICATED DATASETS AT A PRIMARY STORAGE SYSTEM TO A CROSS-SITE SECONDARY STORAGE SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, NetApp, Inc.

CROSS-REFERENCE TO RELATED APPLICATIONS

This application claims the benefit of Indian Provisional Application No. 202241061494, filed on Oct. 28, 2022, which is hereby incorporated by reference in its entirety for all purposes.

FIELD

Various embodiments of the present disclosure generally relate to multi-site distributed data storage systems. In particular, some embodiments relate to improving resumption time for handling of I/O operations during a common snapshot creation in synchronous replicated datasets between a primary storage system to a secondary mirrored storage system.

DESCRIPTION OF THE RELATED ART

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise. Failures handled manually with user intervention require additional time to restore operations of the business enterprise.

SUMMARY

Multi-site distributed storage systems and computer-implemented methods are described for improving a resumption time of input/output (I/O) operations during a common snapshot procedure for storage objects. A computer-implemented method includes initiating a snapshot multi create operation to selectively form a batch of first and second synchronous replicated datasets each having storage objects that belong to a first group of storage disks at the primary storage site and corresponding second group of storage disks at the secondary storage site, performing a batch snapshot create operation on the primary storage site by executing snapshots of storage objects on the primary storage site of the batch of first and second synchronous replicated datasets in parallel multiple threads to effectively utilize processing resources on the primary storage site, and initiating an independent workflow and state machine for each storage object of the batch of first and second synchronous replicated datasets.

In another embodiment, a computer-implemented method for reducing a resumption time of processing of input/output (I/O) operations during a common snapshot process is performed by one or more processors of a multi-site distributed storage system with a primary storage site having a first storage node and a secondary storage site having a second storage node. The computer-implemented method comprising initiating a snap create handler operation for a storage object of a batch of storage objects having a plurality of replicated datasets with each replicated dataset having a synchronous replication relationship between at least one storage object of the first storage node and at least one replicated storage object of the second storage node, determining whether a consistency point is currently in progress or not, and providing a hint to accelerate a currently in progress consistency point when the consistency point is currently in progress.

In another embodiment, a computer-implemented method for reducing a resumption time of processing of input/output (I/O) operations during a common snapshot process performed is one or more processors of a multi-site distributed storage system with a primary storage site having a first storage node and a secondary storage site having a second storage node. The computer-implemented method comprises establishing a synchronous replication relationship between at least one storage object of the first storage node of the primary storage site and at least one storage object of the second storage node of the secondary storage site, performing a baseline transfer from the at least one storage object of the first storage node to the at least one storage object of the second storage node, starting the common snapshot process including initiating drain and hold state for the primary storage site to stop processing of I/O operations during a time window and start queuing incoming write operations, and to complete pending write operations received before the drain and hold state; performing a snapshot create operation on the primary storage site for the at least one storage object of the first storage node and sending the snapshot create operation to the secondary storage site to be performed on the at least one storage object of the second storage node of the secondary storage site, resuming processing of I/O operations and ending the hold state for the primary storage site, and assigning a new active file system (AFS) version universal unique identifier (UUID) to the at least one storage object of the second storage node after resuming processing of I/O operations with the new AFS version UUID to identify when AFS contents are different than the baseline transfer for synchronous replication between the primary storage site and the secondary storage site.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
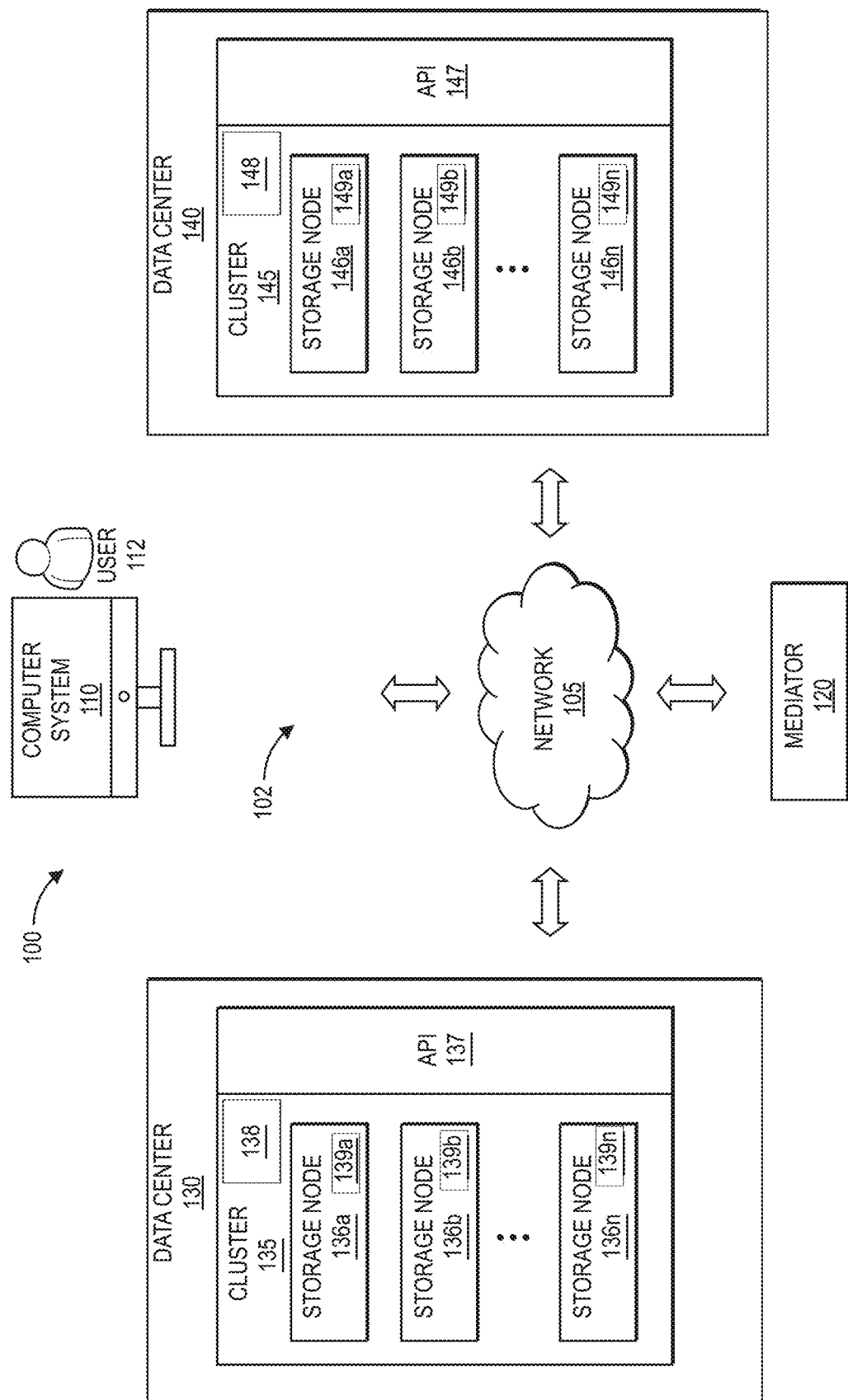
FIG. 1 is a block diagram illustrating an environment in which various embodiments may be implemented.

Multi-site distributed storage systems and computer-implemented methods are described for improving resumption time of processing of input/output (I/O) operations for an application during a common snapshot (CSS) creation in synchronous replicated datasets between a first data set of a primary storage system to a mirrored second data set of a secondary mirrored storage system.

A synchronous data replication from a primary copy of data of a consistency group (CG) at a primary storage system at a first site (primary storage site) to a secondary copy of data at a secondary storage system of a second site (secondary storage site) can fail due to many reasons including inter cluster connectivity issues. These issues can occur if the secondary storage site can not differentiate between the primary storage site being down, in isolation, or just a network partition. A trigger for the automated failover is generated from a data path and if the data path is lost, can lead to disruption. For example, if the primary storage site is not operational or is isolated (e.g., network partition leading to both inter cluster connectivity and connectivity to an external Mediator are lost), then a data replication relationship (or relationship) between the primary and secondary storage sites guarantees non-disruptiveness due to allowing I/O operations to be handled with the secondary mirror copy of data of the second site.

Synchronous replication securely protects enterprise application data by generating a mirror image of the data in a logical volume, logical unit number (LUN), and/or consistency group of LUNs, or volumes to a remote storage system at a physically separate location. This protection means that in case of any kind of outage, revenue-producing applications continue to serve business functions from the secondary remote storage system, which instantly takes over operations from the primary storage system. When a Synchronous replicated relationship for a synchronous replicated dataset is In-Sync, an active file system (AFS) is being constantly modified on both a source data set of the primary storage system because of active I/O and a destination data set of the secondary storage system because of synchronous replication. Thus, AFS can diverge over time from a last common snapshot taken by the asynchronous transfer phase. Note that recovering from out-of-sync involves async transfer based on common snapshot. The more the AFS is divergent from the common snapshot, the more the time it takes to complete the async transfer and more the recovery time to come back In-Sync. To alleviate this problem, Sync Replication will periodically create Common Snapshots. This helps auto resync to transfer less delta data in case the relationship falls Out-of-Sync as the Common Snapshots will be new.

A snapshot is a point in time image of a storage object (e.g., storage volume) in question. Thus, once a snapshot is taken, nothing about the contents of that snapshot change, including any content metadata. The image consumes minimal storage space and incurs negligible performance overhead because it records only changes to files since the last Snapshot copy was made. A Snapshot policy defines how the system creates Snapshot copies of volumes. The policy specifies when to create the Snapshot copies, how many copies to retain, how to name them, and how to label them for replication.

Common snapshot workflow will start with preventing or fencing I/O operations (ops) from being processed on the primary storage system and draining the inflight ops to establish a sync point. The common snapshot workflow will then issue requests on the primary storage system and the secondary storage system so that snapshots containing the same data can be taken. The I/O ops are then resumed. The resultant snapshots are deemed common snapshots between primary and secondary storage systems. However, during this process, clients would experience a brief latency spike due to the preventing or fencing of the I/O operations, depending on the I/O intensity at this point. Since such processing happens for each synchronous replicated datasets, the latency incurred is a function of a number of synchronous replicated datasets. Thus, for a substantial number of such datasets, the latency can potentially grow beyond the timeouts supported by storage networking protocols that could potentially affect application services.

The latency for processing of I/O operations as experienced by a client will be a combination of file system (e.g., Write Anywhere File Layout (WAFL)) processing on the primary storage system and file system processing on the secondary storage system. The slower file system processing will define an eventual client I/O latency.

A previous optimization includes one or more techniques for common snapshot creation. A coordinator workflow is initialized to issue a drain and hold request to a splitter. Responsive to an indication that the splitter has stopped processing and started queuing incoming write operations and has drained current write operations based upon the drain and hold request, a snapshot creation request for a storage object can be sent to the first storage controller and the second storage controller. Responsive to the first storage controller creating a first snapshot of the first storage object and the second storage controller creating a second snapshot of the second storage object, the splitter may be resumed to process write operations.

This previous optimization mentioned above has fundamental problems with scaling synchronous replicated datasets in a high availability (HA)-pair. In one or more techniques referenced, clients would experience a brief latency spike due to the fence, depending on the I/O intensity at this point. Since such processing happens for each synchronous replicated dataset, the latency incurred is a function of the number of synchronous replicated datasets.

The present innovation discloses optimizations to reduce I/O latency spike during CSS to as close as possible to a single Write Op latency, and at the same time keeping the three phases of the technique intact—Drain and hold, snapshot create on primary and secondary storage sites and finally splitter resuming write operations.

Multiple optimization techniques are used to address the problem of I/O latency spike and improve upon the I/O fence period when I/O ops are not processed that could be incurred while creating common snapshot for faster resynchronization in synchronous replicated datasets. As such, embodiments described herein seek to improve the client I/O delay during a fence time period while creating common snapshot for faster resynchronization in synchronous replicated datasets. Various embodiments of the present technology provide for a wide range of technical effects, advantages, and/or improvements to multi-site distributed storage systems and components. Multiple techniques are utilized to improve the efficiency of various operations involved in creating common snapshot and are listed below.

For example, various embodiments may include one or more of the following technical effects, advantages, and/or improvements for reducing the client I/O delay: (i) selectively forming a batch of synchronous replicated datasets that belong to a same grouping of physical storage resources (e.g., disks or array LUNs) in order to provide an ideal scenario for optimizing snapshot create operation on primary and secondary storage systems to serve as a common snapshot, (ii) flushing snapshots for all the datasets taken on primary and secondary storage system to disk in a single aggregate consistency point (CP) (also known as CP Coalescing) on each storage site, (iii) taking snapshots in one CP for a first subset of a batch and taking snapshots of a second subset of the batch in another CP, thus minimizing time spent for each synchronous replicated dataset before unfencing I/O ops (iv) benefit from asynchronous CP, (v) provide a hint to ongoing CP to act faster, (vi) growing snapshot tag meta files before fencing the I/O ops, a file system snapshot create request can now take aggregate affinity and thus fully utilize multithreading in the file system, and (vii) maintaining file system consistency of synchronous replicated datasets.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

An AFS is a file system (e.g., Write Anywhere File Layout) in use, excluding its Snapshot copies. An aggregate is a grouping of physical storage resources (e.g., disks or array LUNs that provide storage to volumes associated with the aggregate. Aggregates provide the ability to control the RAID configuration for all associated volumes.

Mirror protection is a periodic exact mirroring of all volume data (both active and protected) from a source storage system to a destination storage system. If data in the source storage system is lost or made unavailable (e.g., if the source storage system is damaged), then that same data can quickly be made available from the destination mirror site. Mirror operations are employed from primary to secondary storage and from secondary to tertiary storage, in circumstances where secure mirroring of that data, and in event of breakdown at the source site, quick availability of that data from a second site might be required.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes a configuration database 138, multiple storage nodes 136a-n each having a respective mediator agent 139a-n, and an Application Programming Interface (API) 137. In the context of the present example, the multiple storage nodes 136a-n are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n each having a respective mediator agent 149a-n, and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
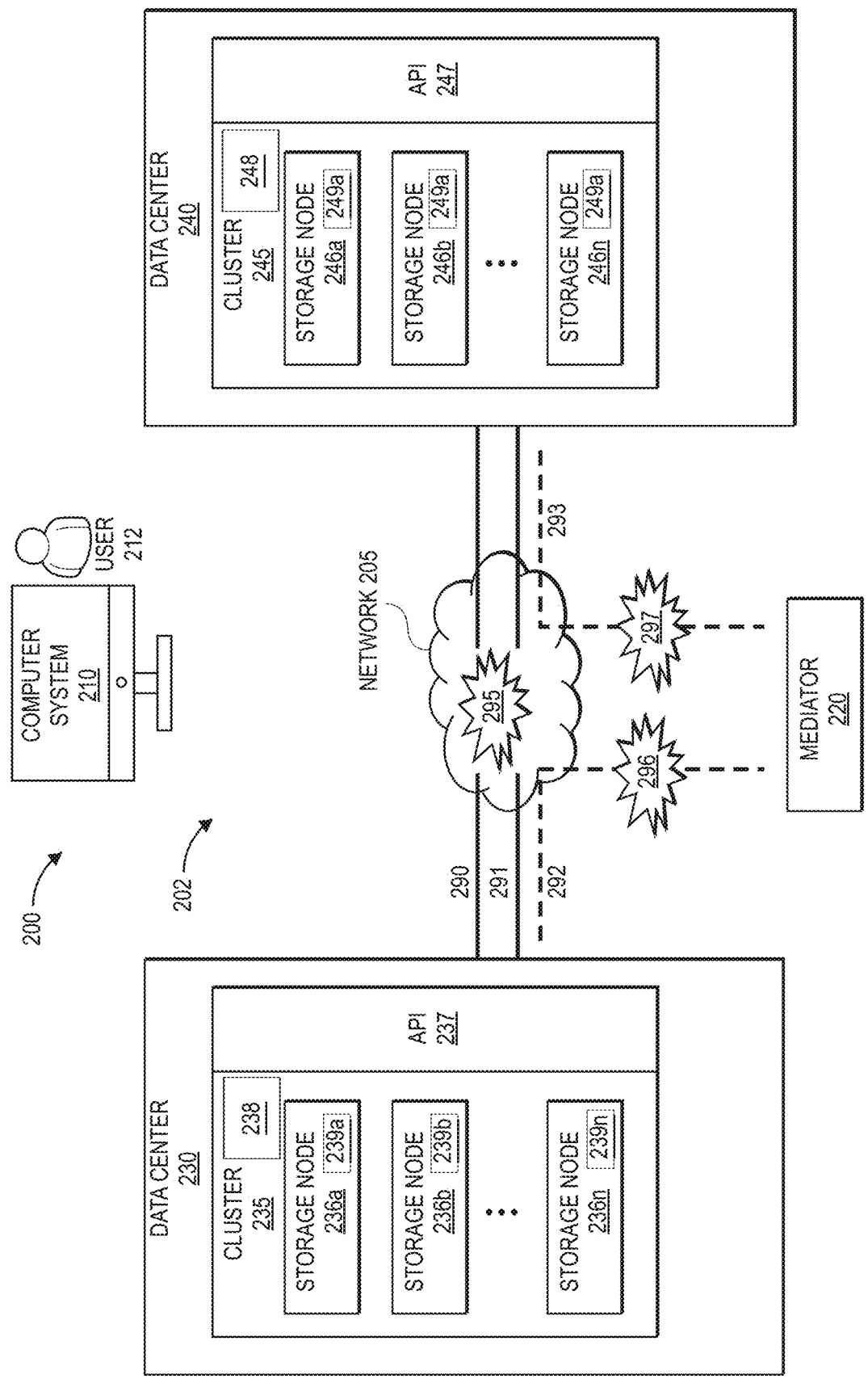
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236a-b, optionally includes additional storage nodes (e.g., 236n) and an Application Programming Interface (API) 237. The storage nodes 236a-n each include a respective mediator agent 239a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246a-b, optionally includes additional storage nodes (e.g., 246n) and includes an Application Programming Interface (API) 247. The storage nodes 246a-n each include a respective mediator agent 249a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure in a cluster hosting the secondary mirror copy of the data. The automatic unplanned failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The unplanned failover feature allows switching storage access from a primary copy of the data center 230 to a mirror copy of the data center 240 or vice versa.

Figure 3:
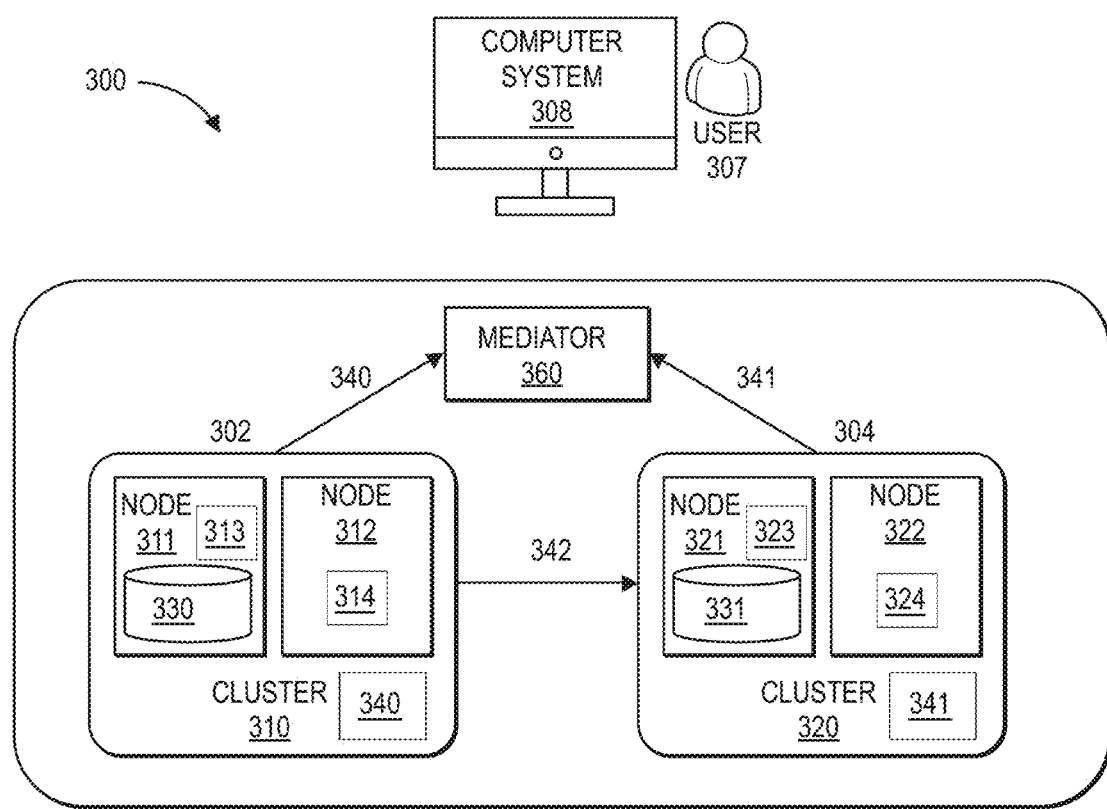
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324) are configured on each node within a cluster. The system 300 can perform appropriate actions based on event processing of the mediator agents. The mediator agent(s) processes events that are generated at a lower level (e.g., volume level, node level)

and generates an output for a consistency group level. In one example, the nodes 311, 312, 321, and 322 form a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
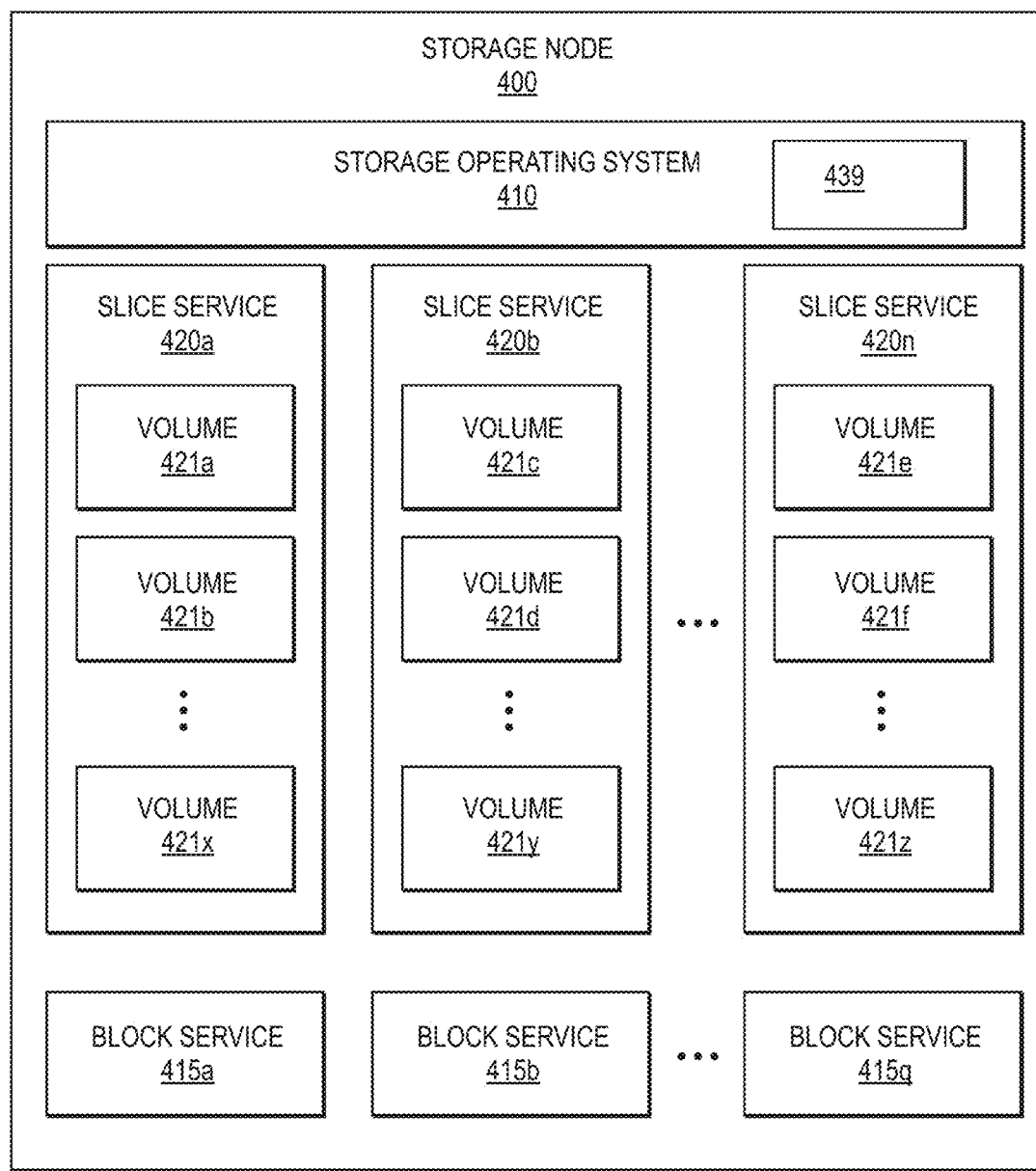
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 321, 322) described herein. In the context of the present example, a storage node 400 may be a network storage controller or controller that provides access to data stored on one or more volumes. The storage node 400 includes a storage operating system 410, a mediator agent 439, one or more slice services 420a-n, and one or more block services 415a-q. The mediator agent 439 can be separate or integrated with the storage operating system 410. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

In one example, a storage node includes a large number of volumes (e.g., 200 volumes) and a high availability pair of nodes includes 200 volumes per node.

Figure 5A:
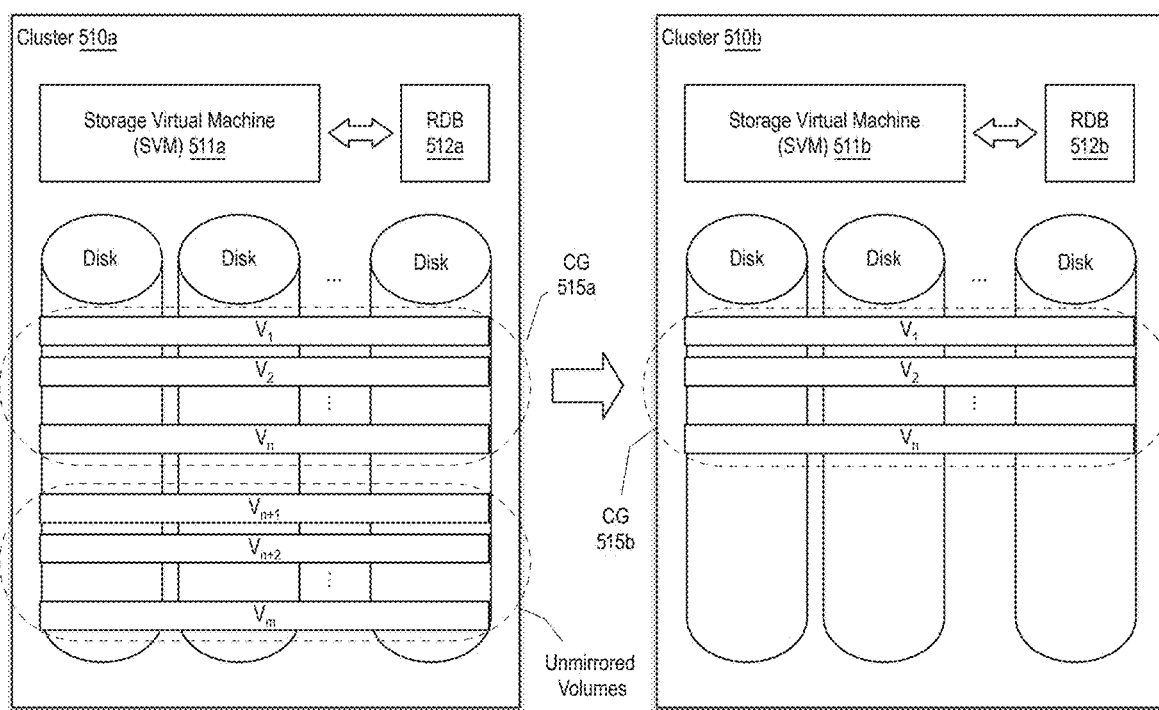
FIG. 5A is a block diagram illustrating the concept of a consistency group (CG) in accordance with an embodiment.

FIG. 5A is a block diagram illustrating the concept of a consistency group (CG) in accordance with an embodiment. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515*a* may be referred to as a local CG from the perspective of cluster 510*a* and as a remote CG from the perspective of cluster 510*b*. Similarly, CG 515*a* may be referred to as a remote CG from the perspective of cluster 510*b* and as a local CG from the perspective of cluster 510*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512*a* and 512*b*), which may store configuration information for their respective clusters. A configuration database provides cluster wide storage for storage nodes within a cluster. The configuration information may include relationship information (e.g., relationship information of a data replication relationship) specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115*b*) to which data is configured to be synchronously replicated may be referred to as being in the role of a destination CG, whereas the CG (e.g., CG 515*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or leader cluster to a secondary or follower cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (leader) cluster is stored on more than one secondary (follower) cluster.

Figure 5B:
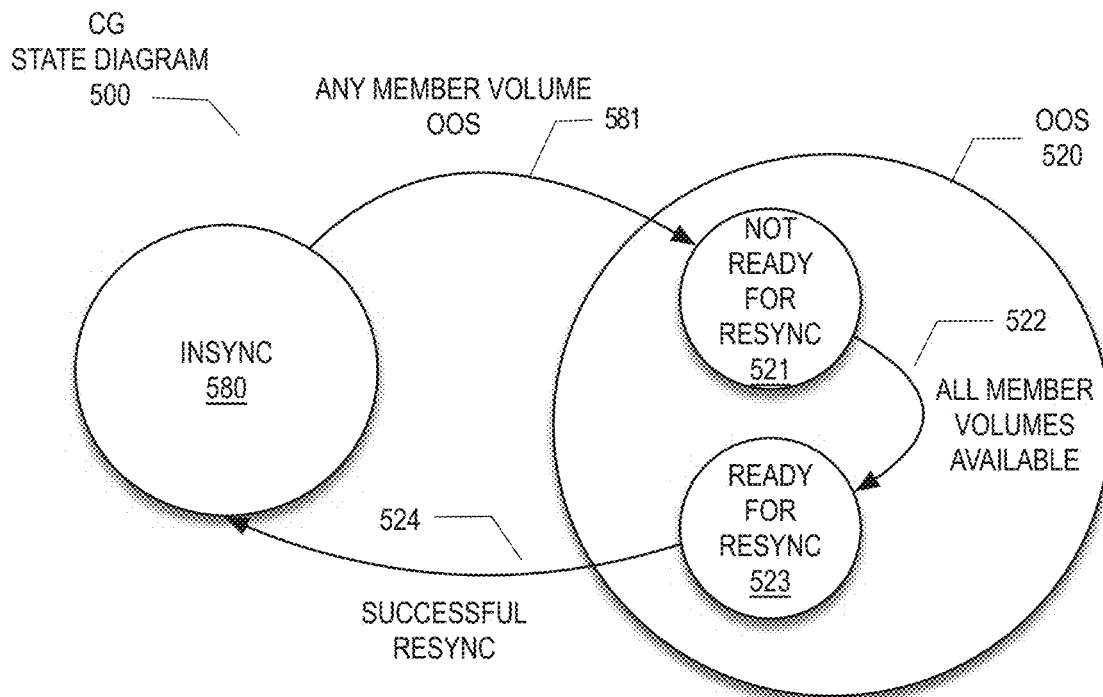
FIG. 5B is a CG state diagram 600 in accordance with an embodiment of the present disclosure.

FIG. 5B is a CG state diagram 500 in accordance with an embodiment of the present disclosure. In the context of the present example, the data replication status of a CG can generally be in either of an InSync state (e.g., InSync 580) or an OOS state (e.g., OOS 520). Within the OOS state, two sub-states are shown, a not ready for resync state 521 and a ready for resync state 523.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 581 from the InSync state to the not ready for resync state 521 of the OOS state responsive to any member volume of the CG becoming OOS with respect to a peer volume with which the member volume is peered. A given CG may transition 522 from the not ready for resync state 521 to the ready for resync state 523 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 524 from the ready for resync state 523 to the InSync state.

Although outside the scope of the present disclosure, for completeness it is noted that additional state transitions may exist. For example, in some embodiments, a given CG may transition from the ready for resync state 523 to the not ready for resync state 521 responsive to unavailability of a mediator (e.g., mediator 120) configured for the given CG. In such an embodiment, the transition 522 from the not ready for resync state 521 to the ready for resync state 523 should additionally be based on the communication status of the mediator being available.

Figure 5C:
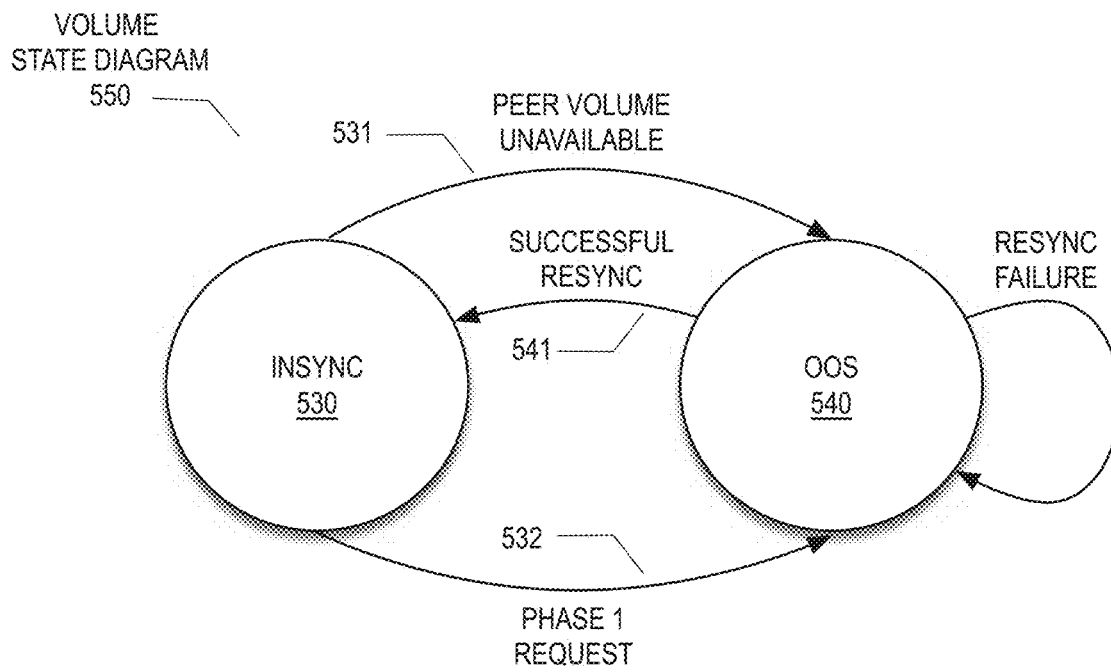
FIG. 5C is a volume state diagram 650 in accordance with an embodiment of the present disclosure.

FIG. 5C is a volume state diagram 550 in accordance with an embodiment of the present disclosure. In the context of the present example, the data replication status of a volume can be in either of an InSync state (e.g., InSync 530) or an 00S state (e.g., 00S 540). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 531 from the InSync state to the OOS state responsive to a peer volume being unavailable. A given volume may transition 532 from the InSync state to the OOS state responsive to a phase one request. A given volume may transition 541 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

FIGS. 6-10 are flow diagrams illustrating computer-implemented methods of operations for multiple techniques to address the problem of I/O latency spike and reduce the I/O fence period when I/O ops are not processed that could be incurred while creating common snapshot for faster resynchronization in synchronous replicated datasets. A successful common snapshot between a volume and a peered volume is needed during resynchronization for transitioning the volume from the OOS state to the InSync state.

Figure 6:
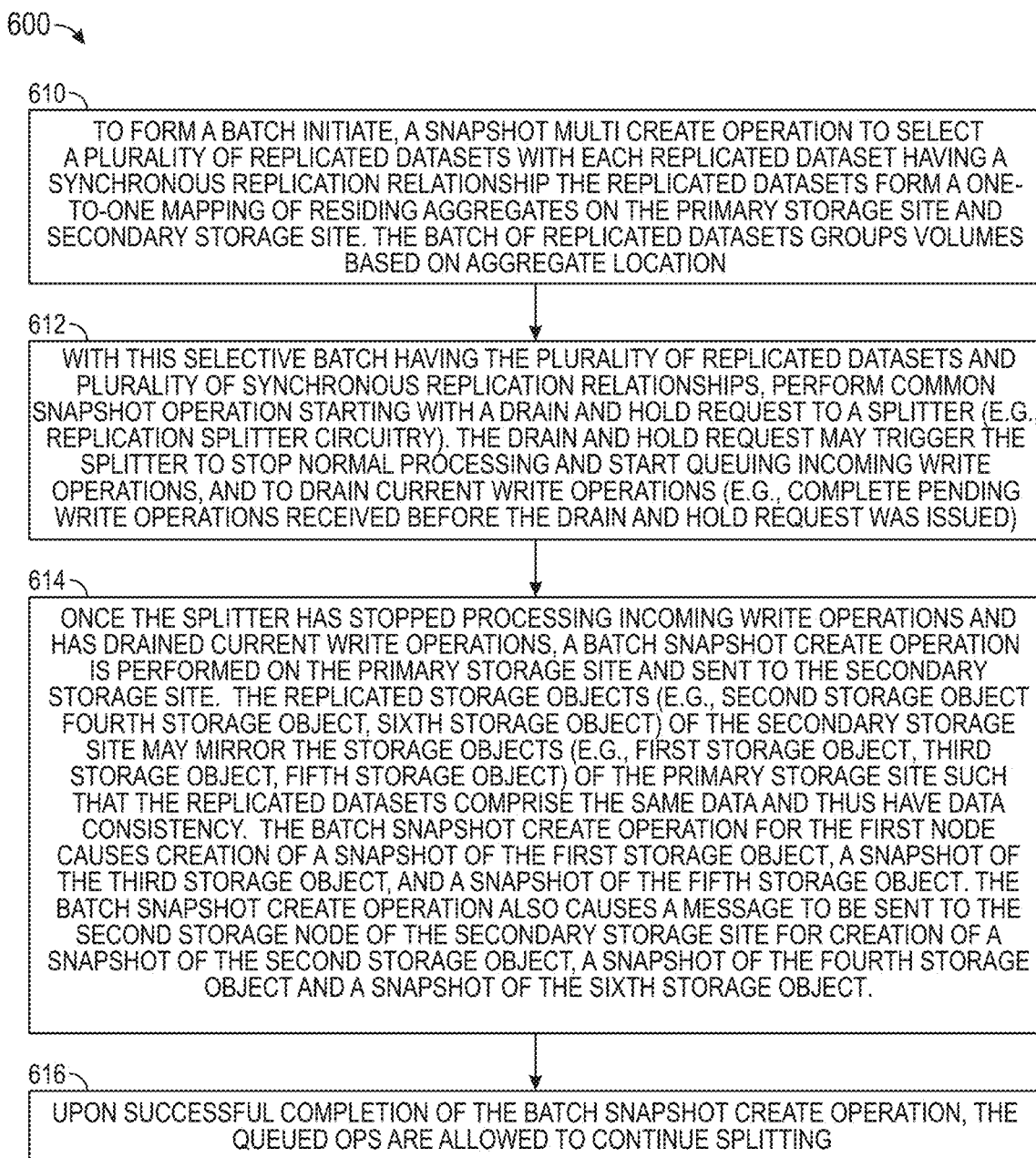
FIG. 6 illustrates a computer-implemented method of operations for reducing the client I/O delay by batching operations across a plurality of synchronous replicated datasets that belong to a first grouping of physical storage resources (e.g., disks or array LUNs) at a primary storage site and a corresponding second grouping of physical storage resources at a secondary storage site in accordance with an embodiment of the present disclosure.

FIG. 6 illustrates a computer-implemented method 600 of operations for reducing the client I/O delay by batching operations across a plurality of synchronous replicated datasets that belong to a first grouping of physical storage resources (e.g., disks or array LUNs) at a primary storage site and a corresponding second grouping of physical storage resources at a secondary storage site in accordance with an embodiment of the present disclosure. Although the operations in the computer-implemented method are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations. Operations can be performed by storage controllers, storage nodes, or virtual storage machines.

In one embodiment, a multi-site distributed storage system includes the primary storage site having a first storage cluster with one or more storage nodes having numerous replicated datasets (e.g., 40, 80, 400 replication relations) that are replicated from the first storage cluster to a second storage cluster of a secondary storage site. For HA storage node pair, a first storage node and a second peered storage node can each have up to 200 volumes.

In one example, a first synchronous replication relationship may exist between a first storage object hosted by a first storage node of a first storage cluster and a replicated second storage object hosted by a second storage node of a second storage cluster. The storage object can be a file, a LUN, a LUN stored across multiple volumes, a volume, a container, a subdirectory, or any other object that may be synchronously replicated between the storage clusters, such that modifications to the first storage object are replicated to the replicated second storage object before acknowledgements are provided back to clients requesting such modifications. A second synchronous replication relationship may exist between a third storage object hosted by the first storage node and a replicated fourth storage object hosted by the second storage node. A third synchronous replication relationship may exist between a fifth storage object hosted by the first storage node and a replicated sixth storage object hosted by the second storage node. One or more consistency groups of the first cluster can be assigned a leader role. One or more consistency groups of the second cluster can be assigned a follower role.

Consistency points (CP) are periodic tasks performed by data management software (e.g., storage OS of a storage node) in which unwritten data that is temporarily stored in the non-volatile RAM (NVRAM), is copied over (committed) to the disks thereby maintaining system consistency. A CP is triggered whenever the file system reaches a point for updating physical data on the storage disk with data accumulated in cache and logged into NVRAM.

Since CP (Consistency Points) happen at an aggregate level for a group of storage disks, forming a batch of synchronous replicated datasets that belong to a same aggregate (e.g., group of storage disks) provides an ideal scenario for optimizing snapshot create operations on primary and secondary storage sites to serve as a common snapshot. At operation 610, to form this batch, the method initiates a snapshot multi create operation to select a plurality of replicated datasets (e.g., 2 to 200 replicated datasets) with each replicated dataset having a synchronous replication relationship. The replicated datasets form a one-to-one mapping of residing aggregates on the primary storage site and secondary storage site. The batch of replicated datasets groups volumes based on aggregate location. The snapshot multi create operation indicates a batch identifier and number of volumes in one or more storage nodes of a batch.

At operation 612, with this selective batch having the plurality of replicated datasets and plurality of synchronous replication relationships, the method performs common snapshot operation starting with a drain and hold request to a splitter (e.g., replication splitter circuitry). The drain and hold request may trigger the splitter to stop normal processing and start queuing incoming write operations, and to drain current write operations (e.g., complete pending write operations received before the drain and hold request was issued). If any of the storage objects of the selective batch transition from insync to OOS, then a common snapshot is used between a storage object and a peered storage object during resynchronization for transitioning the storage object from the OOS state back to the InSync state.

The splitter, for the first storage object, during normal operation is configured to split write operations to target both the first storage object and the replicated second storage object having the first synchronous replication relationship. For example, the splitter may receive a write operation targeting the first storage object. The splitter may split the write operation into a replication write operation. The splitter may instruct the first storage node to locally implement the write operation upon the first storage object and instruct the second storage node to remotely implement the replication write operation upon the second storage object.

At operation 614, once the splitter has stopped processing incoming write operations and has drained current write operations, a batch snapshot create operation is performed on the primary storage site and sent to the secondary storage site to be performed on the secondary storage site. The replicated storage objects (e.g., second storage object, fourth storage object, sixth storage object) of the secondary storage site may mirror the storage objects (e.g., first storage object, third storage object, fifth storage object) of the primary storage site such that the replicated datasets comprise the same data, and thus have data consistency. The batch snapshot create operation for the first node causes creation of a snapshot of the first storage object, a snapshot of the third storage object, and a snapshot of the fifth storage object. The batch snapshot create operation also causes a message to be sent to the second storage node of the secondary storage site for creation of a snapshot of the second storage object, a snapshot of the fourth storage object, and a snapshot of the sixth storage object. The message may include a batch identifier, a number of storage objects for the batch, and any additional information needed for the second storage node to create the snapshots on the replicated storage objects. In an example, the snapshots of the storage objects of the first storage node and the snapshots of the replicated storage objects of the second storage node are performed in parallel.

At operation 616, upon successful completion of the batch snapshot create operation, the queued ops are allowed to continue splitting. Snapshots create operations on a file system of the primary storage site and a file system of the secondary storage site will benefit from forming a batch of synchronous replicated datasets for snapshot create operations to handle snapshots for a large number of storage objects and minimize load on the file systems from creation of snapshots, which may occur frequently.

The snapshot multi create operations are optimized by executing the batch snapshots in parallel multiple threads to effectively utilize most or all of the processing resources (e.g., a microcontroller, a microprocessor, central processing unit core(s), an application-specific integrated circuit (ASIC), a field programmable gate array (FPGA), and the like) available on most or all of the storage nodes.

Figure 7:
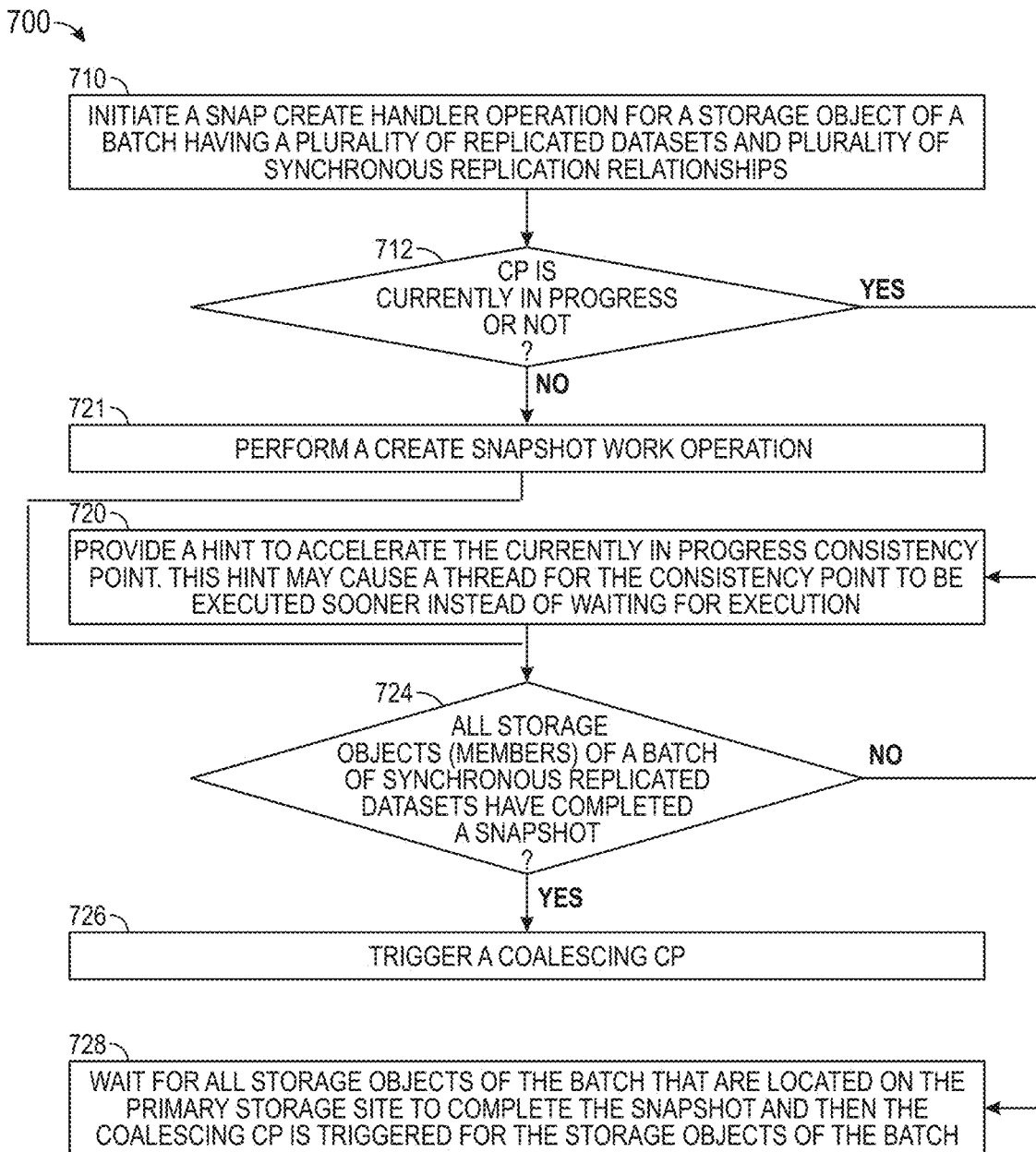
FIG. 7 is a flow diagram illustrating a computer-implemented method for reducing IORT by accelerating an in progress CP and coalescing CPs into a single aggregate CP per storage site for snapshots of all of the synchronous replicated datasets of a batch that are located on primary and secondary storage sites accordance with an embodiment of the present disclosure.

FIG. 7 is a flow diagram illustrating a computer-implemented method 700 for reducing IORT by accelerating an in progress CP and coalescing CPs into a single aggregate CP per storage site for snapshots of all of the synchronous replicated datasets of a batch that are located on primary and secondary storage sites accordance with an embodiment of the present disclosure.

It is inevitable that snapshot create operations on file systems of the primary and secondary storage sites should take as low as latency as possible since the client I/O is being held during this period. Snapshot creation operations in primary and secondary storage sites are one of the major contributing factors to client I/O latency spike. If each synchronous replicated dataset were to induce an independent CP, this would add up to client I/O latency for other synchronous replicated datasets because CPs (Consistency Points) are serialized in the file system at aggregate level.

Hence, the optimizations of the present design perform this file system processing independent of an increasing number of synchronous replicated datasets to support scaling issues in common snapshot procedure. To provide this feature, snapshots for most or all of the synchronous replicated datasets taken on primary and secondary storage sites will be flushed to disk in a single aggregate CP (also known as CP Coalescing) on each storage site, thus providing a benefit of low I/O latency being observed for each synchronous replicated dataset. CP coalescing also reduces system load in the file system by decreasing a number of CPs, which has a direct impact to reduce I/O latency spike during the I/O fence period.

At operation 710, the method includes initiating a snap create handler operation for a storage object of a batch having a plurality of replicated datasets (e.g., 2 to 200 replicated datasets) with each replicated dataset having a synchronous replication relationship between a storage object and a replicated storage object. At operation 712, the method determines whether a consistency point is currently in progress or not on the primary storage site or secondary storage site. The CP may be in progress for a reason (e.g., fully loaded file system, scheduled timer, high or low watermark for NVRAM, or various other reasons, etc.) that is not related to creating a new snapshot. If so, then at operation 720 the method provides a hint to accelerate the currently in progress consistency point. This hint may cause a thread for the consistency point to be executed sooner instead of waiting for execution.

It is at times inevitable that snapshot creation requests on either primary or secondary file systems might get suspended if there is an ongoing CP that can be active due to other reasons for CP trigger. If a storage node waits until the current CP is finished and only then proceeds with snapshot create requests in the file system this adds time to overall client I/O latency, if the storage node ran into such race. Given the nature of synchronous replicated datasets, in which the endpoints are part of different storage sites altogether, it is not deterministically possible to avoid such race on both primary and secondary storage sites at the same time. To tackle this problem, the storage sites use Fast CP to hint an ongoing CP to act faster and thus drastically reduce suspension times in the file system for snapshot create requests on the primary storage site or secondary storage site.

If no CP is currently in progress, then a create snapshot work operation is performed at operation 721. At operation 724, the method determines whether all storage objects (members) of a batch of synchronous replicated datasets have completed a snapshot. If so, then this can trigger a coalescing CP at operation 726. If not, then at operation 728 the method waits for all storage objects of the batch that are located on the primary storage site to complete the snapshot and then the coalescing CP is triggered for the storage objects of the batch.

A CP can be started for many varied reasons. The goal behind all these reasons is to keep the file system working in an efficient manner. If a storage node waits too long before starting a CP, this may over commit system resources and hang the file system. On the other hand, starting CP's too frequently will overburden the file system with the overhead of starting a CP without getting much done. If CP is triggered from a timer, a watermark setting, NVLOG full or various other reasons, the entire batch is not held to finish.

Watermarks are global settings used to manage a Storage Node's usable storage space. Watermarks are used to trigger alarms that assist in monitoring available storage and determine when adding Storage Nodes is required. A Storage Node becomes read-only when all of a Storage Node's object stores reach the Storage Volume Hard read-Only Watermark. If available space falls below this configured watermark amount, a Notice alarm is triggered for the Storage Status (SSTS) attribute. This manages storage proactively and adds capacity only when necessary. A high watermark setting indicates that an amount of modified data in a storage node's cache (e.g., NVRAM) exceeds a threshold and this can cause a CP to start to force the modified data to the storage disk. A storage volume hard read-only watermark indicates when a storage node transitions to hard read-only mode and will no longer accept write requests. A storage volume soft read-only mode means that the storage node advertises read-only services to the rest of the storage system, but fulfills all pending write requests. A storage volume transient cache low watermark can cause initiation of a CP due to lack of available space for data in the cache.

A subset of storage objects of a batch can take snapshots in one CP and the other subset of storage objects of the batch can take snapshots in another CP, thus minimizing time spent for each synchronous replicated dataset before unfencing I/O. In addition, this technique will also make sure that dependent write order consistency of replication operation is not compromised.

In addition, the storage node does not wait until all the contents are flushed to disk as part of a CP. Volumes with file system errors (e.g., Dirty volumes) are marked first and Inodes, and then wait till the current cache (e.g., NV log half) is locked due to triggering CP and make sure that front-end Ops are switched to another NV log half.

FIGS. 8A, 8B, 9A, and 9B illustrate operations for multiple common snapshot optimizations to reduce the I/O fence period when I/O ops are not processed for faster resynchronization in synchronous replicated datasets in accordance with an embodiment of the present disclosure.

Although the operations in FIGS. 8A, 8B, 9A, and 9B are shown in a particular order, the order of the actions can be modified. Thus, the illustrated embodiments can be performed in a different order, and some operations may be performed in parallel. Some of the operations listed in FIGS. 8A, 8B, 9A, and 9B are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of FIGS. 8A, 8B, 9A, and 9B may be executed by a storage node, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

Figure 8A:
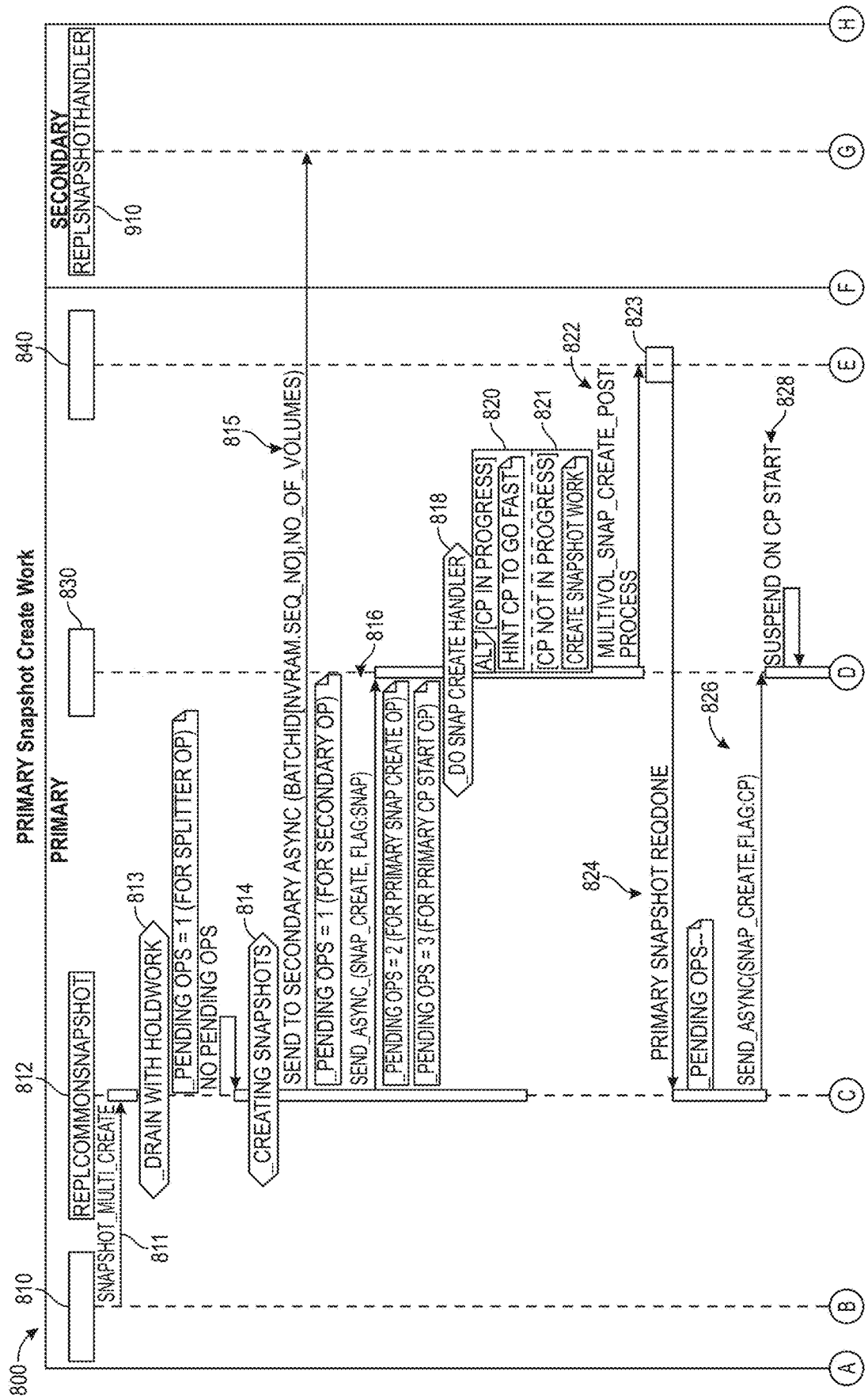
FIGS. 8A, 8B, 9A, and 9B illustrate operations for multiple common snapshot optimizations to reduce the I/O fence period when I/O ops are not processed in accordance with an embodiment of the present disclosure.
Figure 8B:
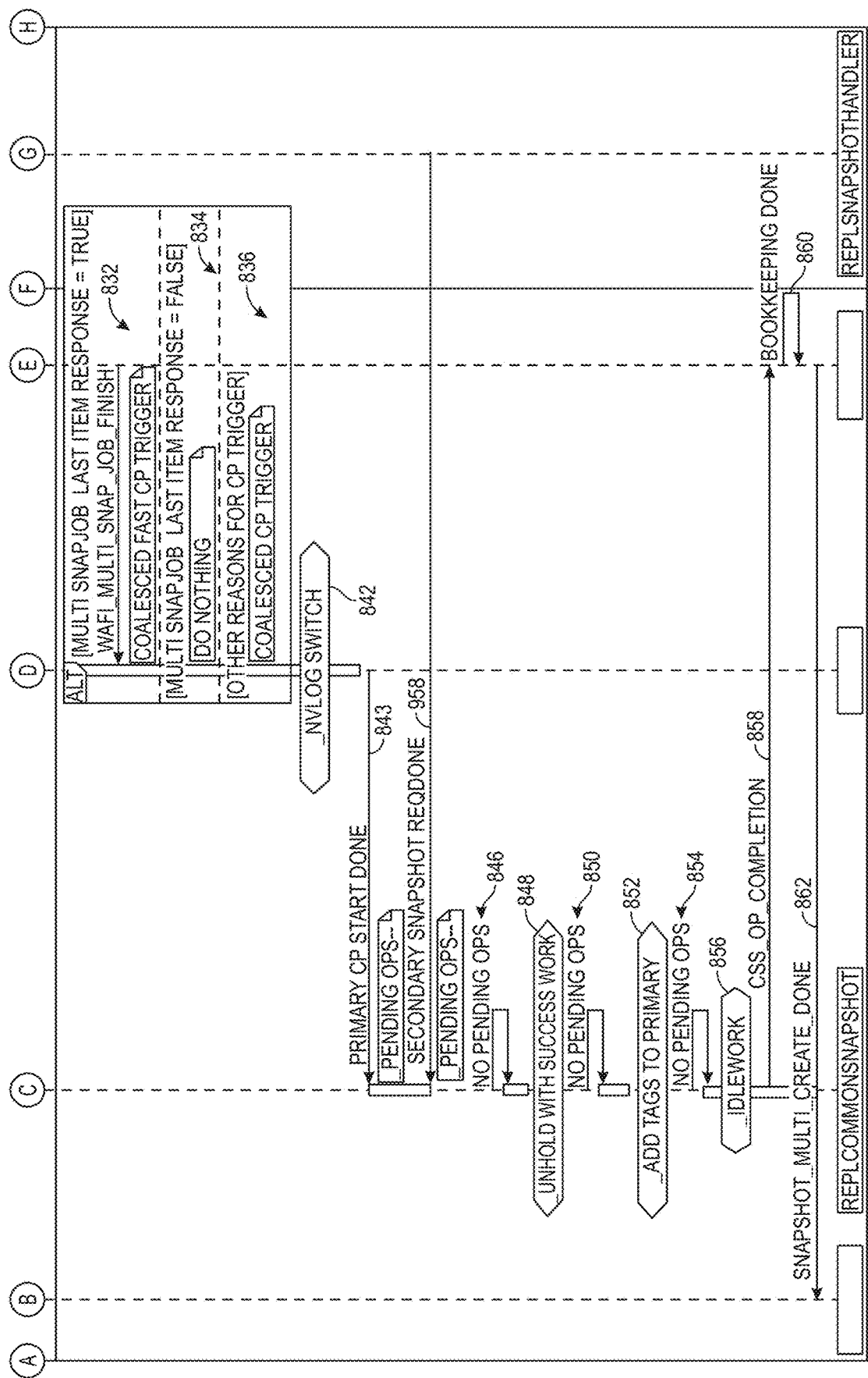

FIGS. 8A and 8B illustrate a primary snapshot create workflow (or computer-implemented method) in accordance with one embodiment for a primary storage site. A primary cluster (or first cluster) of the primary storage site includes different software components including a snapshot multi create component 810, a replicating common snapshot component 812, a file system 830, and a snapshot component 840. A secondary cluster (or second cluster) of a secondary storage site includes include different software components including a replicating snapshot handler 910, a snapshot Op component 920, a file system 930, and a snapshot component 960. The primary snapshot create workflow 800 includes different states (e.g., drain with hold state 813, batch snapshot create state 814, snap create handler state 818, nvlog switch state 842) of a state machine for each storage object of a replicating dataset. Each storage object has its own state machine and will transition from state to state as illustrated in the primary snapshot create workflow 800. Different storage objects of a replicating dataset operate in parallel for transitioning from state to state.

A snapshot multi create component 810 of the primary storage site provides a snapshot multi create job 811 to initiate creation of snapshots for a batch that includes a plurality of replicated datasets (e.g., 2 to 200 replicated datasets) with each replicated dataset having a synchronous replication relationship between at least one storage object of a first node of the primary cluster and at least one replicated storage object of a second node of the secondary cluster. A thread of the component 810 initiates an independent workflow for each storage object (e.g., volume) in the batch.

The replicating common snapshot component 812 performs a drain with hold state 813 to trigger a splitter (e.g., replication splitter circuitry) to stop normal processing and start queuing incoming write operations, and to drain current write operations (e.g., complete pending write operations received before the drain and hold request was issued). A timer can be set to ensure that incoming write operations are not held up indefinitely during the common snapshot.

Once the splitter has stopped processing incoming write operations and has drained current write operations, a batch snapshot create state 814 is performed on the primary storage site and also sent to the secondary storage site with request 815 to be performed on the secondary storage site. The replicated storage objects (e.g., second storage object, fourth storage object, sixth storage object) of the secondary storage site may mirror the storage objects (e.g., first storage object, third storage object, fifth storage object) of the primary storage site such that the replicated datasets comprise the same data, and thus have data consistency. In one example, the batch snapshot create state 814 for the first node causes creation of a snapshot of the first storage object, a snapshot of the third storage object, and a snapshot of the fifth storage object. The request 815 may include a batch identifier, a number of storage objects for the batch, and any additional information needed for the second storage node to create the snapshots of the replicated storage objects. In an example, the snapshots of the storage objects of the first storage node and the snapshots of the replicated storage objects of the second storage node are performed in parallel.

The optimization workflow 800 tracks pending ops including one for secondary snapshot request 815, one for primary snapshot create request 816 and the other pending Op for CP start requests. This makes sure that in the event of timer expiry that was started just before drain and hold state, incoming write operations are not held up indefinitely, in the event an issue occurs without successfully completing snapshot requests.

A request 816 is asynchronously sent to the file system 830 to indicate a snapshot create for a storage object. Each volume level workflow of a batch can send snapshot create request 816 to the primary file system 830. However, this will not trigger CP yet for any of the volumes in a batch.

At state 818, a snap create handler is initiated to determine whether a consistency point is currently in progress or not. The CP may be in progress for a reason (e.g., fully loaded file system, low level of storage space for NVRAM, certain level of storage space for NVRAM, etc.) that is not related to creating a new snapshot. If so, then at operation 820 the method provides a hint to accelerate the currently in progress consistency point. This hint is additional information to indicate a desired behavior to cause a thread for the consistency point to be assigned to a processing resource sooner for execution instead of waiting longer for execution. The storage OS can pass information as a hint to the underlying system or library. A thread of execution a smallest sequence of programmed instructions that can be managed independently by a scheduler, which is typically a part of the operating system.

Primary file system 830, while the method starts to create snapshots for each volume, if it happens that there is an ongoing CP already in progress, as part of the optimization work, this optimization method hints the current CP to go faster than its usual pace, thus taking benefit of Fast CP. If it happens that there is no ongoing CP, then the method proceeds to create snapshots for each volume in batch at operation 821. Instead of starting with CP, the method sends notification back to the workflow stating that the method is done with snapshot creation for this volume. The CP count that this snapshot is supposed to be in is remembered in a snapshot job data structure maintained by each of the workflow. Each of the independent workflows is then suspended in the file system 830 waiting for CP to get started and NV logs are switched.

A multi volume snap create postprocess message 822 is sent from the file system 830 to the component 840 and then a snapshot creation request completion message 824 is sent to the replicating common snapshot component 812 to indicate completion of a snapshot for a storage object.

In one example, a first storage object, a third storage object, and a fifth storage object transition through the workflow 800 independently in parallel and complete snapshots for the first storage object, the third storage object, and the fifth storage object. If the first storage object, third storage object, and fifth storage object are all members of the batch that are located on the first storage node, then upon completion of the snapshots for these members, this will trigger a coalescing CP at operation 823 that will provide a single CP for all members of the batch (e.g., first storage object, third storage object, and fifth storage object, 20 to 40 members, 2 to 200 members) instead of needing three independent CPs for the first storage object, the third storage object, and the fifth storage object.

In one example, a counter can be initially set with a number of members (e.g., storage objects, volumes) of the batch. The counter is decremented for when each member reaches operation 823 until the counter=0. Then, this triggers the coalescing CP at operation 823 for all members of the batch.

The replicating common snapshot component 812 then sends a snap create message 826 to the file system 830. A suspend on CP start operation 828 acts as a synchronization point to wait until the workflows for all members of the batch (e.g., first storage object, third storage object, and fifth storage object) reach the operation 828. If a multi snap job is finished at operation 832, then the coalescing CP is hinted to go faster to accelerate the coalescing CP for all members of the batch (e.g., the first storage object, the third storage object, and the fifth storage object). This coalescing CP can be asynchronous providing control back to the software application to shorten delay of IO operations and flushing or writing data from NVRAM to disk in an asynchronous manner in a background operation. The asynchronous CP does not wait until all contents are written from the NVRAM to disk.

In contrast, a synchronous CP locks NVRAM of a storage node when half of NVRAM is full and does not allow any I/O operations for a longer time period due to waiting for notification of CP being complete.

If a multi snap job is not finished, then no action is needed and the process waits at operation 834. The coalescing CP is triggered at operation 836 when other reasons not related to the snapshot creation caused the CP to trigger.

There are many reasons a CP can be initiated. For example, a file system timer, high or low watermark setting, NVLOG full, etc. If for any of these reasons the CP is started, corresponding to the CP count, workflows will receive notification to move on to the next phase or wait for secondary snapshot callback, if not received yet. Ideally, if CP is not started for any of these reasons, the workflow 800 proactively initiates a Fast CP at the end of all snapshots create request completes. This is achieved by maintaining the total number of volumes participating in a batch in snapshot job data structure. This way the optimization reduces client I/O latency on other volumes by attempting to start a single CP to flush all the snapshots for the volumes belonging to same batch.

Once the optimization has initiated CP, there is no need to wait for the optimization to be completed. Rather, the optimization only waits till freezing the current NV log half and makes sure to switch the front-end ops to another NV log half. However, this optimization can move to the next phase of resume write operations through splitter only when both primary and secondary storage sites have completed snapshot create requests for all the volumes, and a CP on both primary and secondary storage sites. This will ensure dependent write order consistency assumptions are broken.

At NVlog switch state 842, a message 843 is sent from the file system 830 to the replicating common snapshot component 812 to indicate that the coalescing CP for all members of the batch (e.g., first storage object, the third storage object, and the fifth storage object, 2 to 200 volumes) has completed. The replicating common snapshot component 812 can receive a message 958 from the snapshot handler 910 to indicate that the snapshot creation is complete for all replicating storage objects (e.g., second storage object, fourth storage object, and sixth storage object) of the second node of the secondary storage site. The snapshot creation workflows are occurring in parallel such that the message 958 can be received by the component 812 before or after message 843 is received by the component 812.

No pending Ops 846 indicates no pending Ops for the primary storage site. The snapshots have been successfully created for all members of the batch (e.g., first storage object, third storage object, fifth storage object) of the first node and also for all member of the batch (e.g., second storage object, fourth storage object, and sixth storage object of the second node.

The storage objects then transition to an unhold state 848 due to the successfully creation of the snapshots. I/O operations can then be processed again on the primary storage site for these storage objects of the replicated datasets that have been batched together for the snapshot creation. The workflow 800 continues with no pending Ops 850, an add tags to primary state 852, no pending Ops 854, and an idle work state 856. During this state, a common snapshot Op completion 858 message is sent to component 840 for bookkeeping 860 and then a snapshot multi create done message 862 is sent to the snapshot multi create component 810 to complete the workflow 800.

Figure 9A:
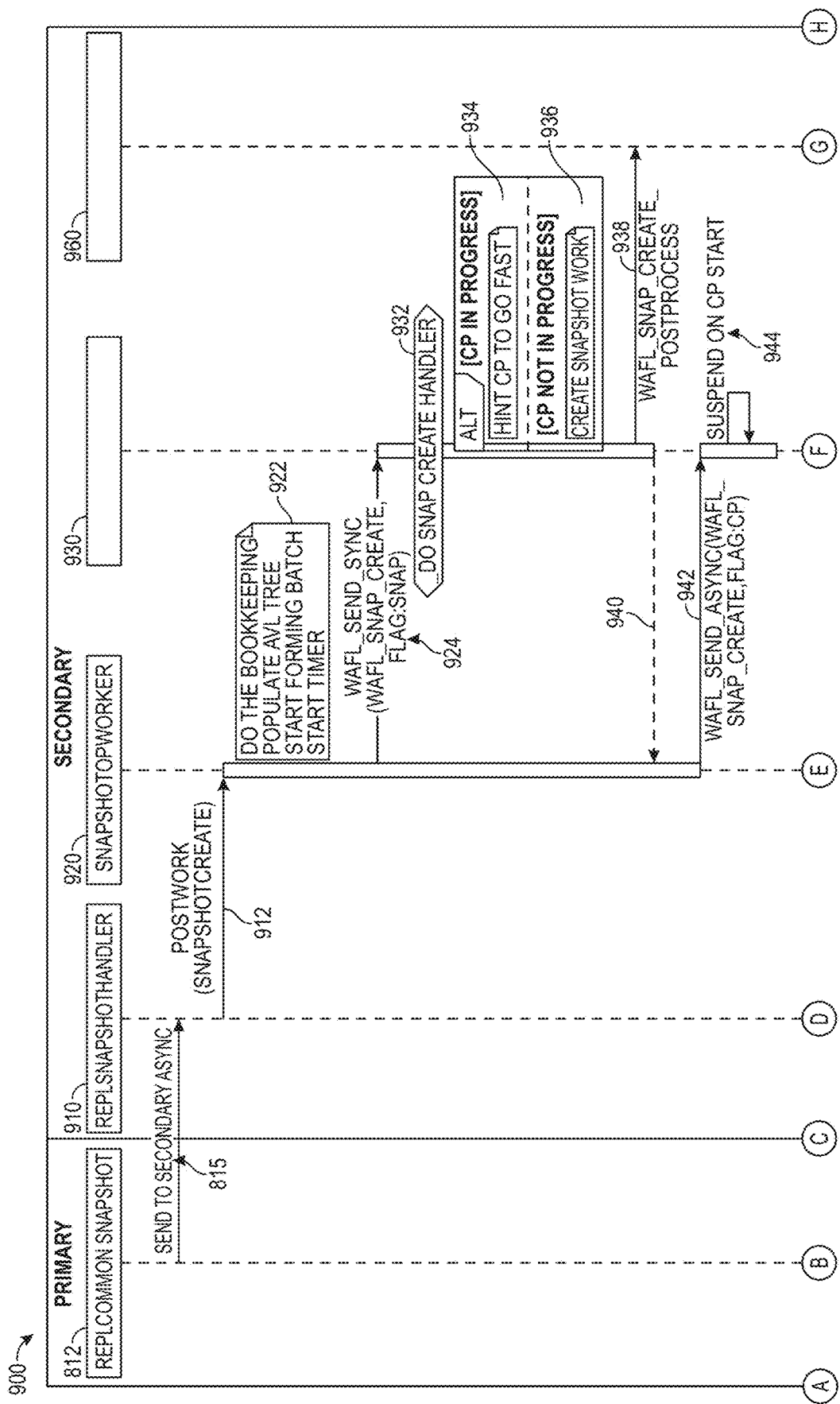
Figure 9B:
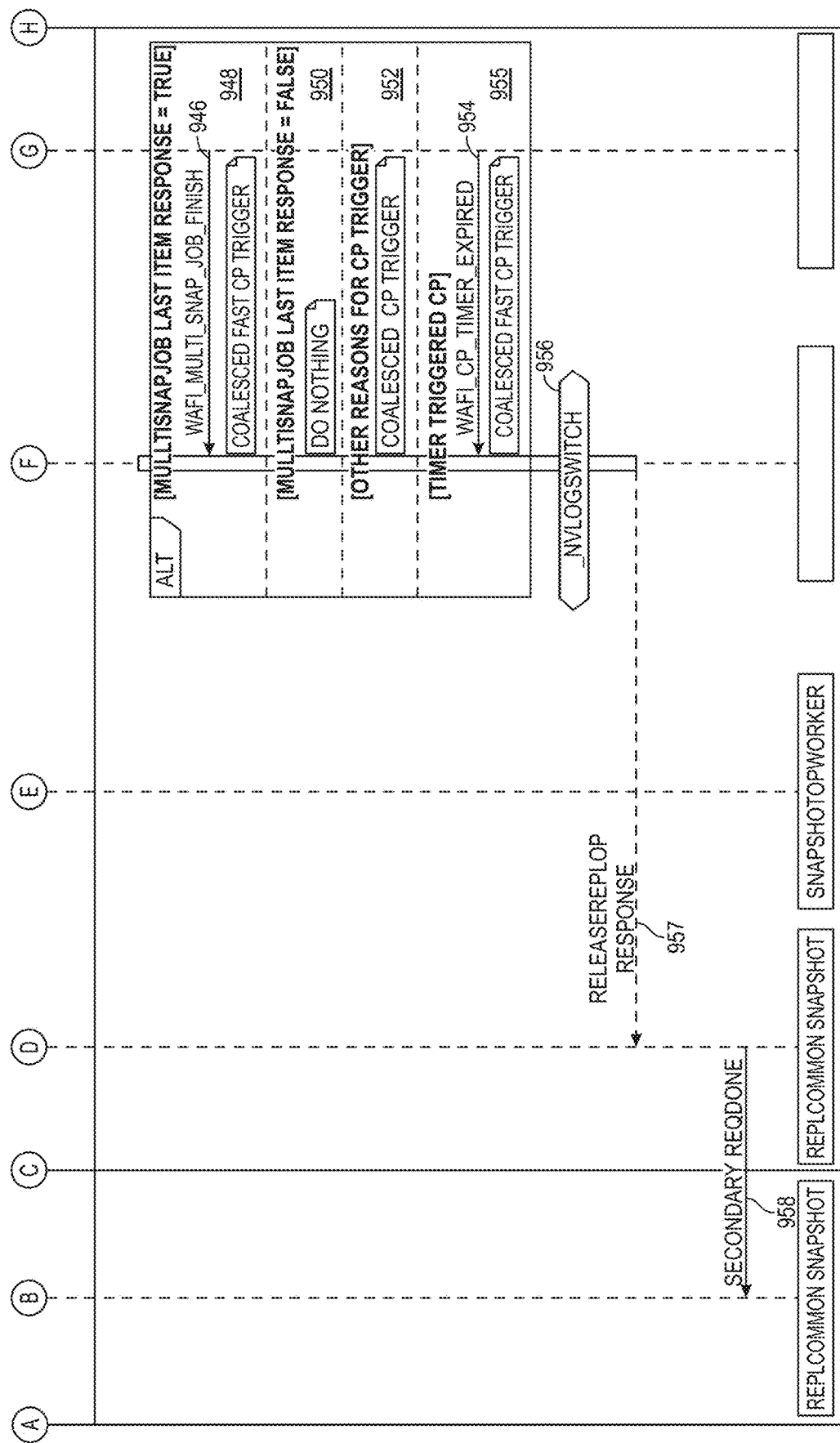

The secondary storage site has a similar workflow compared to the primary storage site. FIGS. 9A and 9B illustrate a secondary snapshot create workflow (or computer-implemented method) in accordance with one embodiment for a secondary storage site. A secondary cluster (or second cluster) of the secondary storage site includes different software components including a replicating snapshot handler 910, a snapshot Op component 920, a file system 930, and a snapshot component 960. The secondary snapshot create workflow 900 includes different states (e.g., snap create handler state 932, nvlog switch state 956) of a state machine for each storage object of a replicating dataset. Each storage object has its own state machine and will transition from state to state as illustrated in the secondary snapshot create workflow 900. Different storage objects of a replicating dataset operate in parallel for transitioning from state to state.

A replicating snapshot handler 910 receives a request 815 from the primary storage site to initiate batch creation of snapshots for a batch that includes a plurality of replicated datasets (e.g., 2 to 200 replicated datasets) with each replicated dataset having a synchronous replication relationship between at least one storage object of a first node of the primary cluster and at least one replicated storage object of a second node of the secondary cluster. The replicating snapshot handler 910 generates a snapshot create operation 912 based on the request 815. An independent workflow can be initiated for each replicated storage object (e.g., volume) in the batch.

In one example, the batch creation of snapshots for the second node causes creation of a snapshot of the second storage object, a snapshot of the fourth storage object, and a snapshot of the sixth storage object. The request 815 may include a batch identifier, a number of storage objects for the batch, and any additional information needed for the second storage node to create the snapshots of the replicated storage objects. In an example, the snapshots of the storage objects of the first storage node and the snapshots of the replicated storage objects of the second storage node are performed in parallel.

A snapshot Op component 920 performs bookkeeping for the batch creation of snapshots, populates a tree structure to store a batch identifier and number of volumes, starts forming the batch of replicated storage objects, and starts timer at operation 922. A request 924 is asynchronously sent to the file system 930 to indicate a snapshot create for the file system. At state 932, a snap create handler is initiated to determine whether a consistency point is currently in progress or not. The CP may be in progress for a reason (e.g., fully loaded file system, low level of storage space for NVRAM, certain level of storage space for NVRAM, etc.) that is not related to creating a new snapshot. If so, then at operation 934 the method provides a hint to accelerate the currently in progress consistency point. This hint may cause a thread for the consistency point to be executed sooner instead of waiting for execution.

If no CP is currently in progress, then a create snapshot work operation is performed at operation 936. A multi volume snap create postprocess message 938 is sent from the file system 930 to the component 960 and then a snapshot creation request completion message 940 is sent to the snapshot Op component 920 to indicate completion of a snapshot for a storage object (e.g., second storage object).

In one example, a fourth storage object also transitions through the workflow 900 and completes a snapshot for the fourth storage object and a sixth storage object also transitions through the workflow 900 and completes a snapshot for the sixth storage object. If the second storage object, fourth storage object, and sixth storage object are all members of the batch that are located on the second storage node, then upon completion of the snapshots for all members, this will trigger a coalescing CP that will provide a single CP for the second storage object, fourth storage object, and sixth storage object instead of needing three CPs for the second storage object, the fourth storage object, and the sixth storage object.

The snapshot Op component 920 then sends a snap create message 942 to the file system 930. A suspend on CP start operation 944 acts as a synchronization point to wait until the workflows for the second storage object, the fourth storage object, and the sixth storage object reach the operation 944. If a multi snap job is finished at operation 946, then the coalescing CP is hinted at operation 948 to go faster to accelerate the coalescing CP for all members of the batch (e.g., the second storage object, the fourth storage object, and the sixth storage object).

If a multi snap job is not finished, then no action is needed and the process waits at operation 950. The coalescing CP can be triggered at operation 952 when other reasons not related to the snapshot creation caused the CP to trigger. If the CP timer 954 expires, then a coalesced fast CP is triggered at operation 955.

At NVlog switch state 956, a message 957 is sent from the file system 930 to the replicating snapshot handler 910 to indicate that the coalescing CP for the second storage object, the fourth storage object, and the sixth storage object has completed. The replicating snapshot handler 910 sends a message 958 to the primary storage site to indicate that the snapshot creation is complete for all replicating storage objects of the batch (e.g., second storage object, fourth storage object, and sixth storage object) of the second node of the secondary storage site.

The secondary storage site maintains a data structure to keep track of all incoming snapshot create requests on the secondary storage site. All incoming snapshot requests are then sent to the file system 930 for snapshot creation without triggering CP. All incoming snapshot requests are then suspended on CP count that are passed in from the snapshot job data structure. It is then the asynchronous response from the file system 930 that keeps track of snapshot completion requests and triggers a single Fast CP once all snapshots create requests are done in the file system 930. In the event when not all expected requests are received on the secondary storage site, a timer will trigger Fast CP including all snapshots that have already been completed. In one example, this timer was started upon reception of first incoming snapshot request in a batch. The life span of this timer on a destination volume lasts for seconds and is a factor of network round trip time (RTT). The idea is to trigger CP if not all expected snapshot requests are received on the secondary storage node.

Figure 10:
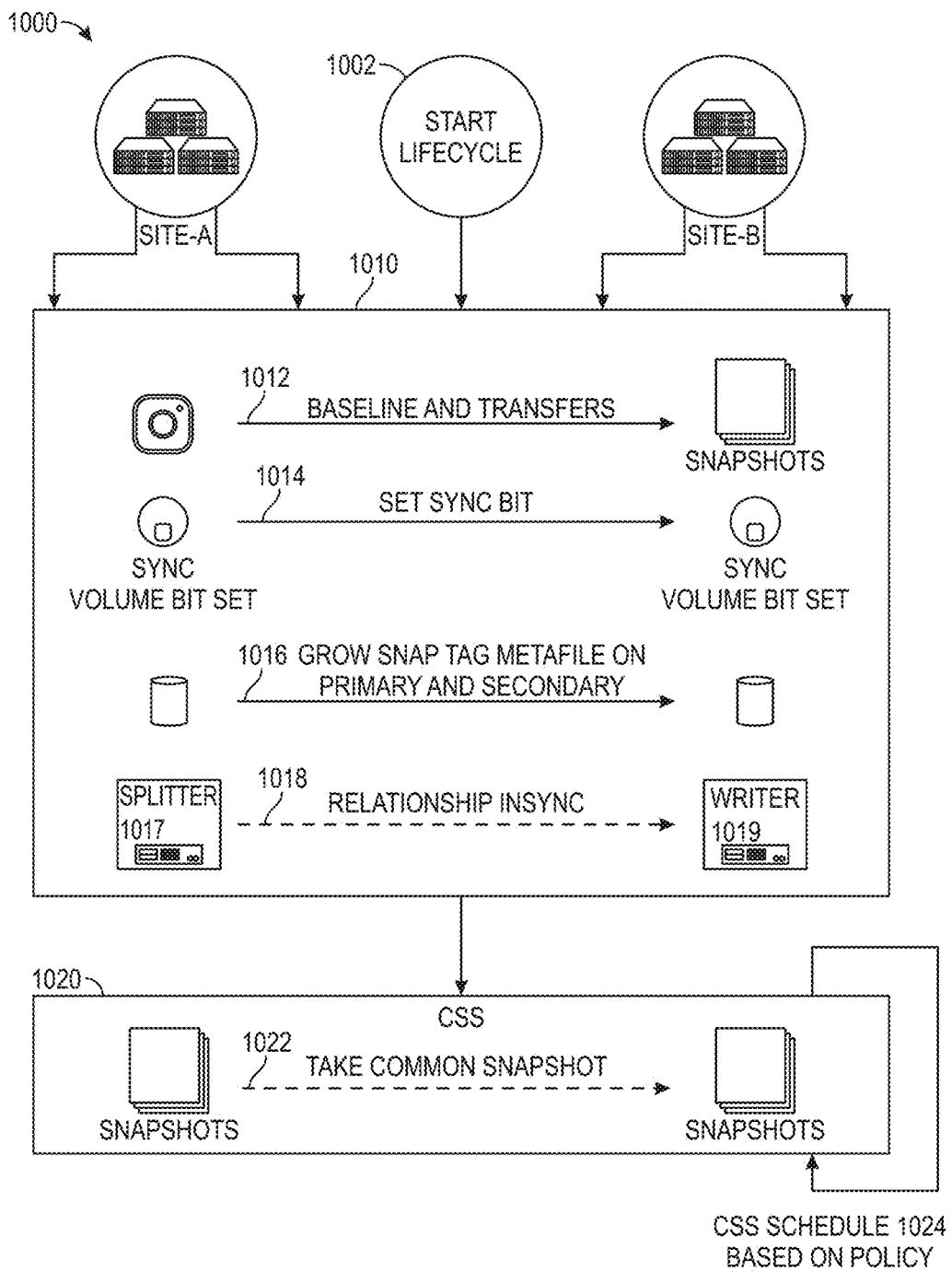
FIG. 10 illustrates a method of growing the snapshot tag meta files during a replication process for replicated datasets in accordance with one embodiment.

FIG. 10 illustrates a method of growing the snapshot tag meta files during a replication process for replicated datasets in accordance with one embodiment. Each replicated dataset has a synchronous replication relationship between at least one storage object of a first node of the primary storage site and at least one replicated storage object of a second node of the secondary storage site.

The operations of FIG. 10 may be executed by a storage node (e.g., storage node 400), a storage virtual machine (e.g., SVM 511a, SVM 511b), a mediator (e.g., mediator 120, mediator 220, mediator 360), a mediator agent (e.g., mediator agent 139a-139n, mediator agent 149a-149n, mediator agent 239a-239n, mediator agent 249a-249n, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

The data replication for replicated datasets replicates data at high speeds over LAN or WAN to provide high data availability and fast data replication for software applications (e.g., email applications, database applications, etc.). When data is replicated from a primary storage site to a second storage site and continually updating of the secondary data occurs, the data is kept current and remains available whenever needed.

When creating common snapshots on primary or secondary storage sites, each file system snapshot create request can take a slow path to serial affinity to grow the snapshot tag meta files for adding tags to the snapshot. By increasing the number of synchronous replication datasets to support higher scale number, this problem might blow up further affecting client I/O latency since this adding of tags typically occurs during a user I/O hold window. By growing the snapshot tag meta file during a synchronous replication method 1000 before fencing the I/O operations, the file system snapshot create request can now take aggregate affinity (instead of serial affinity) and thus fully utilize multithreading of processing resources in the file system. This helps even further to move serial operations in the file system out of client I/O hold window.

One previous technique of a storage OS allows incremental parallelization. This technique includes an affinity scheduler to dynamically assign ready affinities (e.g., stripe 1, stripe 3) with idle threads of processing resources (e.g., CPU). User files can be partitioned into fixed-sized chunks called file stripes. The file stripes rotate over a set of message queues called stripe affinities. A serial affinity processes work outside of file stripes.

A replication process 1010 includes operations 1012, 1014, 1016, and 1018. At operation 1002, the method includes starting a synchronous data replication lifecycle for replicating data from a storage object of a first storage node of storage site A to a storage object of a second storage node of storage site B. At operation 1012, baseline and asynchronous data transfers are performed from storage site A to storage site B. Operation 1012 performs a baseline transfer from a source storage object (e.g., volume) of storage site A to a destination storage object (e.g., volume) of storage site B. The baseline transfer typically involves creating a snapshot copy of the source volume, transferring the snapshot copy and all the data blocks it references to the destination volume, and transfer the remaining, less recent Snapshot copies on the source volume to the destination volume for use in case the "active" mirror is corrupted.

Once a baseline transfer is complete, the method 1000 transfers only new snapshot copies to the mirror. Updates are asynchronous, following a configurable schedule 1024. Retention mirrors the snapshot policy on the source volume. The destination volume can be activated with minimal disruption in case of a disaster at the storage site A, and reactivate the source volume when service is restored.

At operation 1014, a sync replication volume bit is set for the source volume of the first storage node and also set for the destination volume of the second storage node. At operation 1016, the method adds information (e.g., a transient tag) to a tag metafile for the source volume of the first storage node and optionally also for the destination volume of the second storage node. The purpose of the transient tag is to determine if a common snapshot can be used with a subsequent resync operation or not. For unsuccessful CSS or incomplete CSS, there will be a transient tag present and this enables the resync operation to discard the CSS. Upon a successful CSS, transient tag is removed. If a common snapshot occurs during a configurable time period (e.g., for a successful CSS), then the transient tag is removed. If not, then the transient tag is stored in the metafile to indicate that the common snapshot did not occur during the time period (e.g., for unsuccessful CSS or incomplete CSS). The metafiles for volumes are stored in an aggregate for each volume.

At operation 1018, the method includes establishing an insync state to indicate a synchronous replication for the data replication relationship between the source volume and the destination volume. The splitter 1017, for the source volume, during normal operation is configured to split write operations to target both the source volume and the replicated destination volume. For example, the splitter 1017 may receive a write operation targeting the source volume. The splitter 1017 may split the write operation into a replication write operation. The splitter 1017 may instruct the first storage node to locally implement the write operation upon the source volume and instruct the second storage node to remotely implement the replication write operation upon the destination volume. The writer 1019 of the second storage node can implement the replication write operation.

A common snapshot state 1020 includes operation 1022 for taking common snapshots of the source volume and the destination volume at a configurable schedule 1024 based on a replication policy. FIGS. 8A, 8B, 9A, and 9B illustrate detailed workflows for batching of common snapshots for groups of storage volumes.

Figure 11:
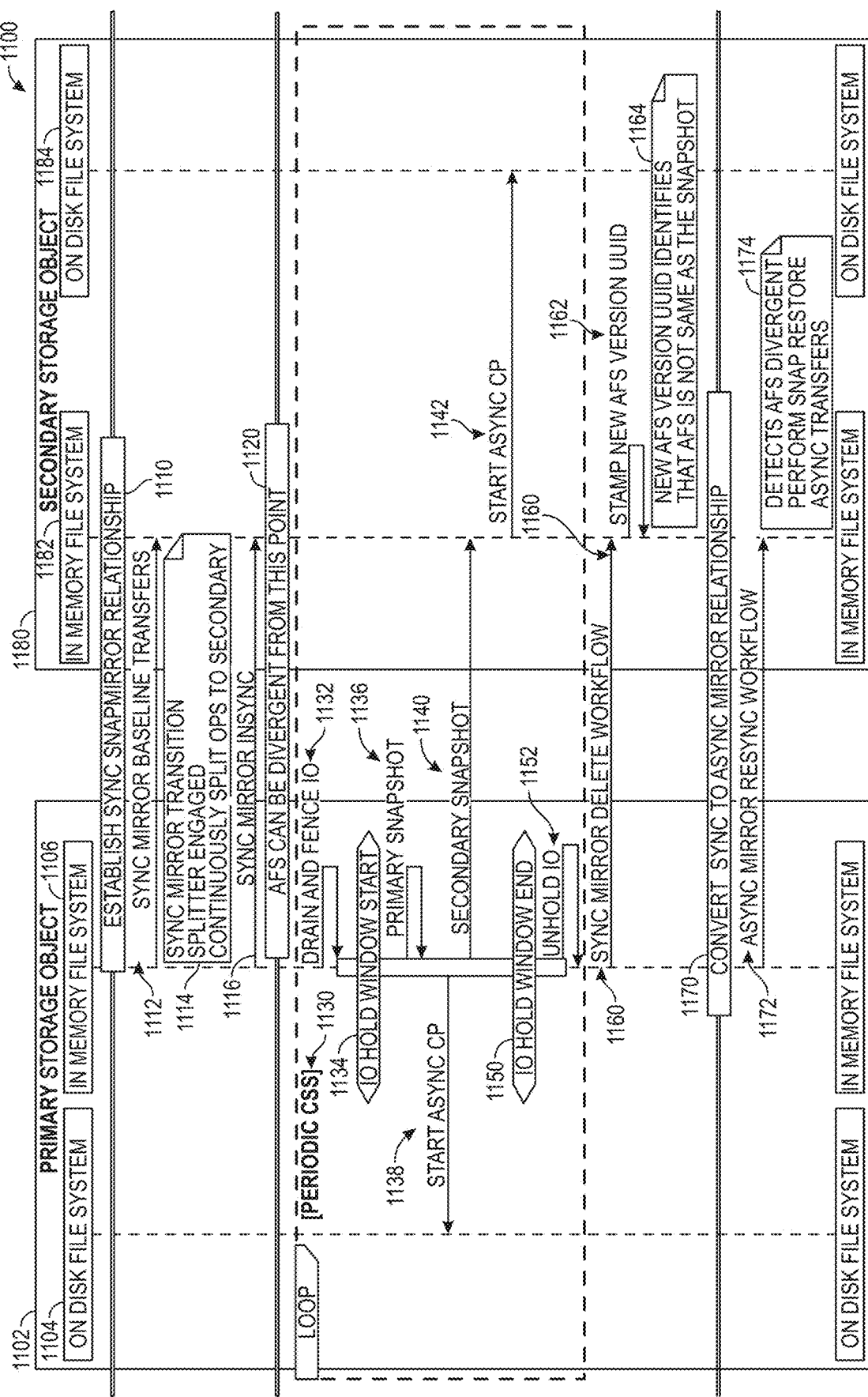
FIG. 11 illustrates a workflow to avoid an AFS divergence (i.e., file system inconsistency) in accordance with one embodiment.

There are two modes of transfer for synchronous relationships. Logical Replication with Storage Efficiency (LRSE) in which Source-side storage efficiency savings are maintained during the transfer between synchronous replication datasets and Logical Replication (LRE) in which Source-side storage efficiency savings are not maintained during the transfer between synchronous replication datasets but can be re-gained at the destination. LRSE writes directly into the AFS of the destination volume and before starting a new transfer the assumption is that the AFS contents are same as the latest snapshot, which is also the base snapshot for synchronous replication. Therefore, a new transfer cannot be started if AFS contents are different from the latest snapshot. AFS divergence happens when this invariant is broken. With synchronous replication, AFS eventually becomes divergent on destination volume when the relationship is In-Sync with a splitter of the primary storage site that is continuously splitting ops to the secondary storage site. This is not an issue if the relationship continues to be a synchronous replication relationship. However, when this relationship is converted to an asynchronous replication relationship that is not aware of AFS divergence, then this optimization must detect a AFS divergence (i.e., file system inconsistency) as that can lead to data corruption due to AFS contents being different from the base snapshot of the transfer, which can occur for any new Op or a failure of snapshot creation. To address this, as part of a common snapshot procedure, during an I/O hold window, after snapshot creation is successful on the secondary storage site, this new optimization assigns a newly generated version universal unique identifier (UUID) as AFS's version UUID, so that this new optimization has a way to identify that AFS is not same as the snapshot. Stamping a new AFS version UUID on destination volume, also comes with prerequisite that this new optimization must finish taking snapshot to disk via CP, in other words wait for CP to complete. This could end up introducing an inconsistency between Snap database and on Disk snapshot content, otherwise. This, however, takes away the benefit of having asynchronous CP on secondary storage site. The design invariant includes moving away from having to assign new AFS version UUID in client I/O hold path. Instead, the present design assigns a new AFS version UUID in a 'delete' workflow as illustrated in FIG. 11 in accordance with one embodiment. This will guarantee that any subsequent asynchronous replication relationship's 'update or resync' transfer will detect this as an AFS divergence and perform a Restore operation to eliminate the AFS divergence. The UUID can be a multibit value to uniquely identify an object or entity. A Restore operation enables quickly reverting a local storage object (e.g., volume or file) to the state the volume or file was in when a particular Snapshot copy was taken. In most cases, reverting a file or volume is much faster than restoring files from tape or copying files from a Snapshot copy to the active file system. After selecting a Snapshot copy for reversion, the storage OS reverts the specified file or the volume to the data and timestamps that it contained when the selected Snapshot copy was taken. Data that was written after the selected Snapshot copy was taken is removed.

A primary cluster (or first cluster) of the primary storage site includes a storage object 1102 (e.g., volume 1102), on disk file system 1104, and in memory file system 1106 as illustrated in FIG. 11. A secondary cluster (or second cluster) of a secondary storage site includes a storage object 1180 (e.g., volume 1180), on disk file system 1184, and in memory file system 1182. The workflow 1100 includes different states or phases including establishing sync replication mirror relationship 1110, periodic common snapshot 1130, sync mirror delete workflow 1160, and async mirror resync workflow 1170. Each storage object has its own state machine and will transition from state to state as illustrated in the 1100. Different storage objects of a replicating dataset operate in parallel for transitioning from state to state.

Initially, the workflow 1100 establishes a synchronous replication mirror relationship 1110 between the storage object 1102 (e.g., volume) of a first node of the primary cluster and the storage object 1180 (e.g., volume) of a second node of the secondary cluster. At operation 1112, a sync mirror baseline transfer occurs from the storage object 1102 to the storage object 1180. At phase 1114, a sync mirror transition occurs with a splitter component being engaged and continuously splitting Ops to the secondary storage site. At operation 1116, the synchronous replication relationship has been established and the storage object 1102 and storage object 1180 are in sync.

Starting at 1120, the AFS can be divergent (i.e., file system inconsistency) and this can lead to data corruption due to AFS contents being different from the base snapshot of the baseline transfer from the storage object 1102 to the storage object 1180. Stamping of AFS version UUID different from a latest snapshot on the storage object (e.g., volume) is a method to detect AFS divergence. Async transfers perform this method as part of starting a new transfer, i.e., stamp AFS with a version UUID of the incremental snapshot. A resynch process explicitly stamps the AFS with a version UUID during transition and synchronization stead-state. The present disclosure relates to optimizations for CSS and ensures that AFS version UUID post CSS is different from a latest snapshot of the storage object to maintain AFS divergence invariant. To summarize, there is no data corruption issue due to AFS being divergent in either transition phase of a resync or in steady state of synchronous replication. The CSS optimizations of the present disclosure ensure no data corruption issue due to AFS divergence during CSS.

Next, a periodic common snapshot process 1130 begins with a drain and fence 1132 of I/O operations on the storage object 1102. The I/O hold window 1134 starts and triggers a splitter (e.g., replication splitter circuitry) to stop normal processing and start queuing incoming write operations, and to drain current write operations (e.g., complete pending write operations received before the drain and hold request was issued). A timer can be set to ensure that incoming write operations are not held up indefinitely during the common snapshot.

Once the splitter has stopped processing incoming write operations and has drained current write operations, a primary snapshot create 1136 is performed on the primary storage site and also a secondary snapshot create 1140 is performed on the secondary storage site. The replicated storage object 1180 of the secondary storage site may mirror the storage object 1102 of the primary storage site such that the replicated datasets comprise the same data, and thus have data consistency. In one example, the CSS process 1130 continues by starting asynchronous consistency point 1138 from the in memory file system 1106 to the on disk file system 1104 (e.g., flushing or writing data from NVRAM to disk in an asynchronous manner in a background operation). The CSS process 1130 initiates a start asynchronous consistency point 1142 from the in memory file system 1182 to the on disk file system 1184.

I/O hold window 1150 ends and I/O operations resume at operation 1152. At operation 1160, a synchronous delete workflow 1160 initiates to remove the synchronous replication relationship between the storage objects 1102 and 1180 and the in memory file system 1182 stamps or assigns a new AFS version UUID on the storage object 1180 at operation 1162. At operation 1164, the new AFS version UUID identifies that the AFS contents are not the same as the baseline transfer at operation 1112.

At operation 1170, a conversion from synchronous replication relationship to asynchronous relationship occurs for the storage objects 1102 and 1180. At operation 1172, the in memory file system 1106 initiates an asynchronous resynchronous workflow to the in memory file system 1182. At state 1174, AFS divergence is detected, a Restore operation is performed to eliminate the AFS divergence, and asynchronous transfers occur.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
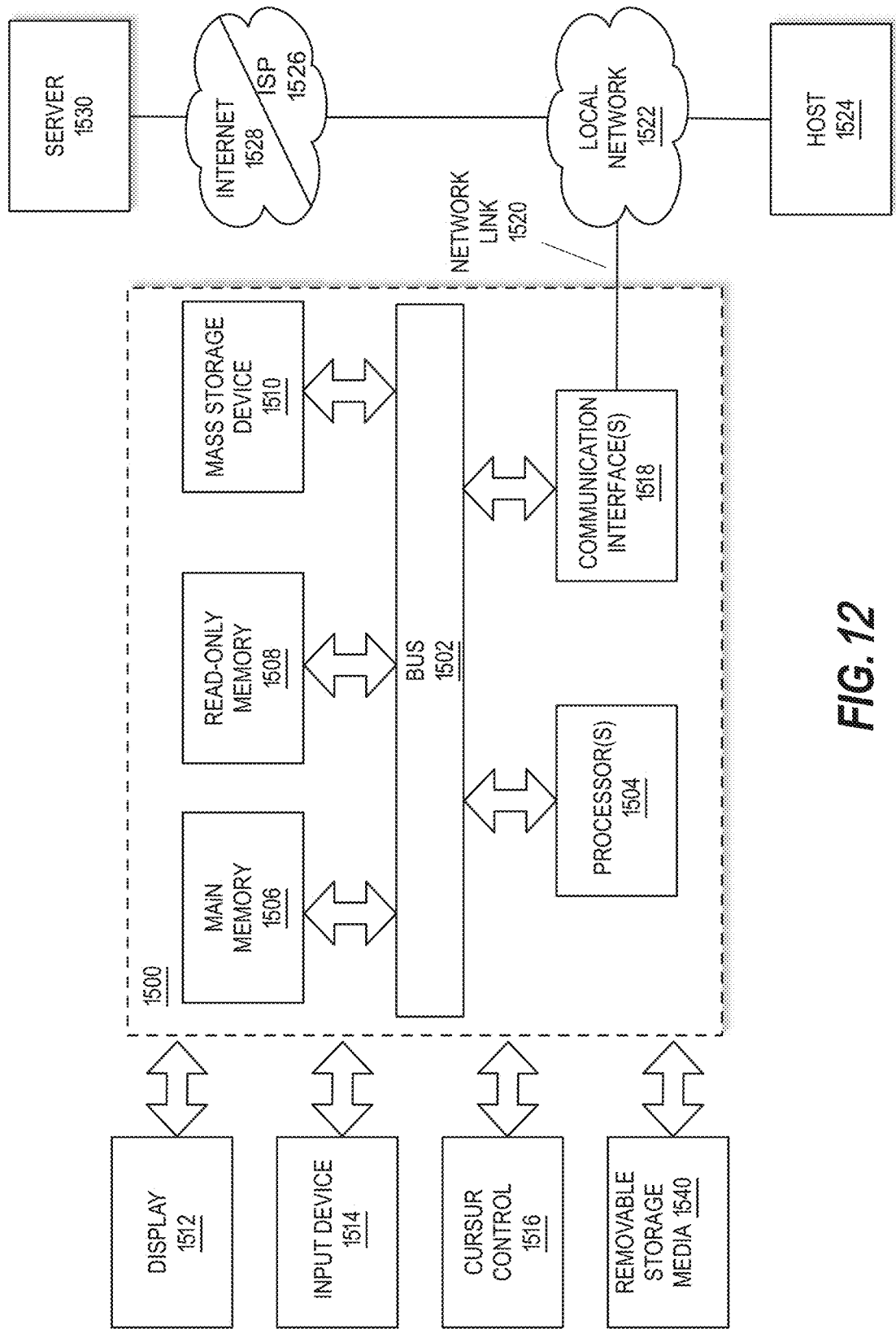
FIG. 12 illustrates an example computer system in which or with which embodiments of the present disclosure may be utilized.

FIG. 12 is a block diagram that illustrates a computer system 1500 in which or with which an embodiment of the present disclosure may be implemented. Computer system 1500 may be representative of all or a portion of the computing resources associated with a storage node (e.g., storage node 136a-n, storage node 146a-n, storage node 236a-n, storage node 246a-n, nodes 311-312, nodes 321-322, storage node 400), a mediator (e.g., mediator 120, mediator 220, mediator 360), or an administrative workstation (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, a non-transitory computer-readable storage medium, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 13:
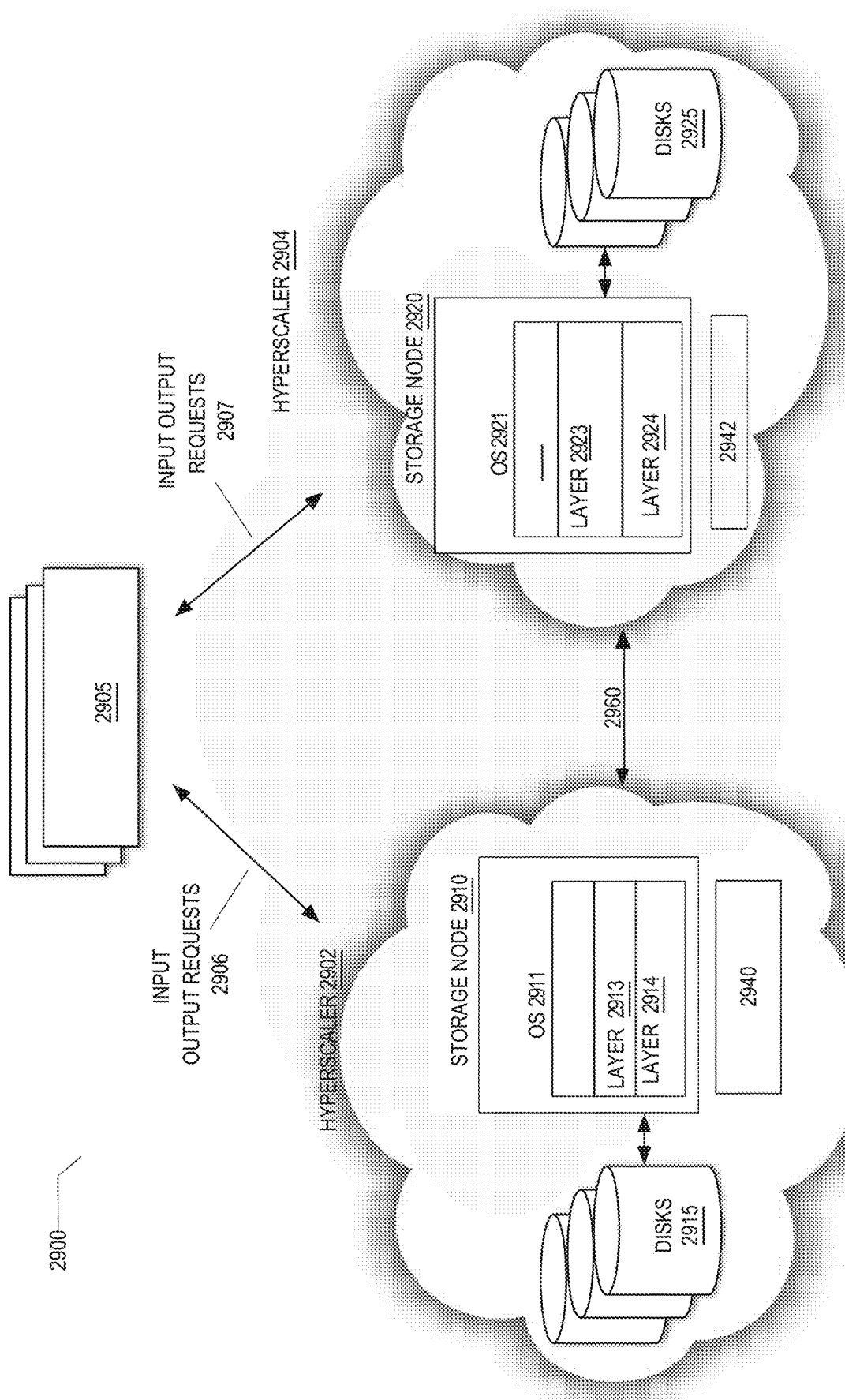
FIG. 13 is a block diagram illustrating a cloud environment in which various embodiments may be implemented.

FIG. 13 is a block diagram illustrating a cloud environment in which various embodiments of the present disclosure having primary and secondary storage sites may be implemented. In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having various layers 2913 and 2914 of a protocol stack for processing of object storage protocol operations or requests.

The virtual storage node 2920 includes an operating system 2921 having various layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

In one embodiment, the present disclosure relates to improving resumption time for handling of I/O operations during a common snapshot creation in synchronous replicated datasets between a primary storage system to a secondary mirrored storage system. According to some embodiments for Example 1, a computer implemented method for reducing a resumption time of processing of input/output (I/O) operations during a common snapshot process performed by one or more processing resources of a multi-site distributed storage system with a primary storage site having a first storage node and a secondary storage site having a second storage node, the computer-implemented method comprising: initiating a snapshot multi create operation to selectively form a batch of first and second synchronous replicated datasets that belong to a first group of storage disks at the primary storage site and corresponding second group of storage disks at the secondary storage site, performing a batch snapshot create operation on the primary storage site by executing snapshots of storage objects on the primary storage site of the batch of first and second synchronous replicated datasets in parallel multiple threads to effectively utilize processing resources on the primary storage site; initiating an independent workflow and state machine for each storage object of the batch of first and second synchronous replicated datasets.

Example 2 includes the subject matter of Example 1, further comprising starting a drain and hold state for the primary storage site to stop processing of I/O operations and start queuing incoming write operations, and to complete pending write operations received before the drain and hold state. Subsequent to the drain and hold state, performing the batch snapshot create operation on the primary storage site for each storage object of the batch and sending the batch snapshot create operation to the secondary storage site to be performed on each storage object of the batch of the secondary storage site in parallel multiple threads to effectively utilize processing resources on the secondary storage site, wherein the first replicated dataset of the batch has a synchronous replication relationship between a first storage object of the primary storage site and a replicated second storage object of the secondary storage site.

Example 3 includes the subject matter of any of Examples 1-2, further comprising: tracking pending operations of the primary storage site.

Example 4 includes the subject matter of any of Examples 1-3, wherein the batch snapshot create operation causes creation of a snapshot of the first storage object and a snapshot of the replicated second storage object of the first synchronous replicated dataset.

Example 5 includes the subject matter of any of Examples 1-4, wherein the batch snapshot create operation causes creation of a snapshot of a third storage object and a snapshot of a replicated fourth storage object of the second synchronous replicated dataset.

Example 6 includes the subject matter of any of Examples 1-5, wherein the snapshot multi create operation indicates a batch identifier and a number of storage objects in one or more storage nodes of the batch.

Example 7 includes the subject matter of any of Examples 1-7, further comprising: upon successful completion of the batch snapshot create operation, the queued ops are allowed to continue splitting for the first storage node and the second storage node.

Example 8 is a multi-site distributed storage system having a primary storage site with a first cluster and a secondary storage site with a second cluster comprising: a processing resource; and a non-transitory computer-readable medium coupled to the processing resource, having stored therein instructions, which when executed by the processing resource cause the processing resource to: initiate a snapshot multi create operation to selectively form a batch of first and second synchronous replicated datasets that belong to a first group of storage disks at the primary storage site and corresponding second group of storage disks at the secondary storage site; initiate an independent workflow and state machine for each storage object of the batch of first and second synchronous replicated datasets; and start a drain and hold state for the primary storage site to stop processing of I/O operations and start queuing incoming write operations, and to complete pending write operations received before the drain and hold state.

Example 9 includes the subject matter of Example 8, wherein the instructions when executed by the processing resource cause the processing resource to: perform a batch snapshot create operation on the primary storage site for each storage object of the batch and send the batch snapshot create operation to the secondary storage site to be performed on each storage object of the batch of the secondary storage site, wherein the first replicated dataset of the batch has a synchronous replication relationship between a first storage object of the primary storage site and a replicated second storage object of the secondary storage site.

Example 10 includes the subject matter of any of Examples 8-9, wherein the instructions when executed by the processing resource cause the processing resource to: tracking pending operations of the primary storage site.

Example 11 includes the subject matter of any of Examples 8-10, wherein the batch snapshot create operation causes creation of a snapshot of the first storage object and a snapshot of the replicated second storage object of the first synchronous replicated dataset.

Example 12 includes the subject matter of any of Examples 8-11, wherein the batch snapshot create operation causes creation of a snapshot of a third storage object and a snapshot of a replicated fourth storage object of the second synchronous replicated dataset.

Example 13 includes the subject matter of any of Examples 8-12, wherein the snapshot multi create operation indicates a batch identifier and a number of storage objects in one or more storage nodes of the batch.

Example 14 includes the subject matter of any of Examples 8-13, wherein the instructions when executed by the processing resource cause the processing resource to: upon successful completion of the batch snapshot create operation, continue splitting the queued ops Example 15 is a non-transitory computer-readable storage medium embodying a set of instructions, which when executed by a processing resource of a storage node cause the processing resource to: initiate a snapshot multi create operation to selectively form a batch of first and second synchronous replicated datasets that belong to a first group of storage disks at the storage node of a primary storage site and corresponding second group of storage disks at a secondary storage site; initiate an independent workflow and state machine for each storage object of the batch of first and second synchronous replicated datasets; and start a drain and hold state for the primary storage site to stop processing of I/O operations and start queuing incoming write operations, and to complete pending write operations received before the drain and hold state.

Example 16 includes the subject matter of Example 15, wherein the instructions when executed by the processing resource cause the processing resource to: perform a batch snapshot create operation on the primary storage site for each storage object of the batch and send the batch snapshot create operation to the secondary storage site to be performed on each storage object of the batch of the secondary storage site, wherein the first replicated dataset of the batch has a synchronous replication relationship between a first storage object of the primary storage site and a replicated second storage object of the secondary storage site.

Example 17 includes the subject matter of any of Examples 15-16, wherein the instructions when executed by the processing resource cause the processing resource to: tracking pending operations of the primary storage site.

Example 18 includes the subject matter of any of Examples 15-17, wherein the batch snapshot create operation causes creation of a snapshot of the first storage object and a snapshot of the replicated second storage object of the first synchronous replicated dataset.

Example 19 includes the subject matter of any of Examples 15-18, wherein the batch snapshot create operation causes creation of a snapshot of a third storage object and a snapshot of a replicated fourth storage object of the second synchronous replicated dataset.

Example 20 includes the subject matter of any of Examples 15-19, wherein the snapshot multi create operation indicates a batch identifier and a number of storage objects in one or more storage nodes of the batch.

Example 21 is a computer-implemented method for reducing a resumption time of processing of input/output (I/O) operations during a common snapshot process performed by one or more processors of a multi-site distributed storage system with a primary storage site having a first storage node and a secondary storage site having a second storage node, the computer-implemented method comprising: initiating a snap create handler operation for a storage object of a batch of storage objects having a plurality of replicated datasets with each replicated dataset having a synchronous replication relationship between at least one storage object of the first storage node and at least one replicated storage object of the second storage node; determining whether a consistency point is currently in progress or not; and providing a hint to accelerate a currently in progress consistency point when the consistency point is currently in progress.

Example 22 includes the subject matter of Example 21, wherein the hint to cause a thread for the consistency point to be executed sooner instead of waiting for execution to reduce suspension times in a file system for snapshot create requests on the primary storage site or secondary storage site.

Example 23 includes the subject matter of any of Examples 21-22, further comprising: performing a create snapshot work operation when no consistency point is currently in progress.

Example 24 includes the subject matter of any of Examples 21-23, further comprising: determining whether all storage objects of the batch for the first storage node have completed a snapshot; and initiating a coalescing consistency point for all storage objects of the batch for the first storage node when all storage objects of the batch for the first storage node have completed a snapshot, wherein the coalescing consistency point provides a single consistency point for all storage objects of the batch.

Example 25 includes the subject matter of any of Examples 21-24, further comprising: waiting for all storage objects of the batch for the first storage node to complete the snapshot when all storage objects of the batch for the first storage node have not completed the snapshot; initiating the coalescing consistency point when all storage objects of the batch for the first storage node have completed the snapshot; and proactively accelerating the coalescing consistency point when all storage objects of the batch for the first storage node have completed the snapshot.

Example 26 includes the subject matter of any of Examples 21-25, wherein the coalescing consistency point is asynchronous to provide control back to a software application to shorten delay of input/output (I/O) operations for the first storage node and to flush or write data from non-volatile memory to a group of disks for the first storage node in an asynchronous manner in a background operation.

Example 27 includes the subject matter of any of Examples 21-26, wherein the consistency point is in progress for a reason including a fully loaded file system, a scheduled timer, or a high or low watermark for NVRAM that is not related to creating a new snapshot.

Example 28 includes the subject matter of any of Examples 21-27, wherein if a consistency point is triggered from a timer, a watermark setting, or NVLOG full, the entire batch of storage objects for the first storage node is not held to finish.

Example 29 is a distributed storage system having a primary storage site with a first storage node and a secondary storage site with a second storage node comprising: a processing resource; and a non-transitory computer-readable medium coupled to the processing resource, having stored therein instructions, which when executed by the processing resource cause the processing resource to: initiate a snap create handler operation for a storage object of a batch of storage objects having a plurality of replicated datasets with each replicated dataset having a synchronous replication relationship between at least one storage object of the first storage node and at least one replicated storage object of the second storage node; determine whether a consistency point is currently in progress or not; and providing a hint to accelerate a currently in progress consistency point when the consistency point is currently in progress.

Example 30 includes the subject matter of Example 29, wherein the hint to cause a thread for the consistency point to be executed sooner instead of waiting for execution to reduce suspension times in a file system for snapshot create requests on the primary storage site or secondary storage site.

Example 31 includes the subject matter of any of Examples 29-30, wherein the instructions when executed by the processing resource cause the processing resource to: perform a create snapshot work operation when no consistency point is currently in progress.

Example 32 includes the subject matter of any of Examples 29-31, wherein the instructions when executed by the processing resource cause the processing resource to: determine whether all storage objects of the batch for the first storage node have completed a snapshot; and initiate a coalescing consistency point for all storage objects of the batch for the first storage node when all storage objects of the batch for the first storage node have completed a snapshot, wherein the coalescing consistency point provides a single consistency point for all storage objects of the batch.

Example 33 includes the subject matter of any of Examples 29-32, wherein the instructions when executed by the processing resource cause the processing resource to: wait for all storage objects of the batch for the first storage node to complete the snapshot when all storage objects of the batch for the first storage node have not completed the snapshot; initiate the coalescing consistency point when all storage objects of the batch for the first storage node have completed the snapshot; and proactively accelerate the coalescing consistency point when all storage objects of the batch for the first storage node have completed the snapshot.

Example 34 includes the subject matter of any of Examples 9-13, wherein the coalescing consistency point is asynchronous to provide control back to a software application to shorten delay of input/output (I/O) operations for the first storage node and to flush or write data from non-volatile memory to a group of disks for all storage objects of the batch of the first storage node.

Example 35 includes the subject matter of any of Examples 29-34, wherein the consistency point is in progress for a reason including a fully loaded file system, a scheduled timer, or a high or low watermark for NVRAM that is not related to creating a new snapshot.

Example 36 includes the subject matter of any of Examples 29-35, wherein if a consistency point is triggered from a timer, a watermark setting, or NVLOG full, the entire batch of storage objects for the first storage node is not held to finish.

Example 37 is a non-transitory computer-readable storage medium embodying a set of instructions, which when executed by a processing resource of a first storage node cause the processing resource to: block input/output (I/O) operations for first and second storage objects of a batch having a plurality of replicated datasets with each replicated dataset having a synchronous replication relationship between at least one storage object of the first storage node and at least one replicated storage object of a second storage node; initiate a coalescing consistency point for storage objects of the batch for the first storage node when the storage objects of the batch for the first storage node have completed a snapshot; and independently unblocking input/output (I/O) operations for the first storage object in the first replicated dataset and the second storage object in the second replicated dataset to reduce delay in performing I/O operations.

Example 38 includes the subject matter of Example 37, wherein the instructions when executed by a processing resource of the first storage node cause the processing resource to unblock input/output (I/O) operations for the first storage object at a first time; and unblock input/output (I/O) operations for the second storage object at a second time.

Example 39 includes the subject matter of any of Examples 37-38, wherein a dependent write order consistency of replication operations for the replicated datasets is maintained.

Example 40 includes the subject matter of any of Examples 37-39, wherein the coalescing consistency point provides a single consistency point for all storage objects of the batch.

Example 41 is a computer-implemented method for reducing a resumption time of processing of input/output (I/O) operations during a common snapshot process performed by one or more processors of a multi-site distributed storage system with a primary storage site having a first storage node and a secondary storage site having a second storage node, the computer-implemented method comprising: establishing a synchronous replication relationship between at least one storage object of the first storage node of the primary storage site and at least one storage object of the second storage node of the secondary storage site; performing a baseline transfer from the at least one storage object of the first storage node to the at least one storage object of the second storage node; starting the common snapshot process including initiating drain and hold state for the primary storage site to stop processing of I/O operations during a time window and start queuing incoming write operations, and to complete pending write operations received before the drain and hold state; performing a snapshot create operation on the primary storage site for the at least one storage object of the first storage node and sending the snapshot create operation to the secondary storage site to be performed on the at least one storage object of the second storage node of the secondary storage site; resuming processing of I/O operations and ending the hold state for the primary storage site; and assigning a new active file system (AFS) version universal unique identifier (UUID) to the at least one storage object of the second storage node after resuming processing of I/O operations with the new AFS version UUID to identify when AFS contents are different than the baseline transfer for synchronous replication between the primary storage site and the secondary storage site.

Example 42 includes the subject matter of Example 41, wherein assigning the new AFS version UUID occurs during a delete workflow to remove the synchronous replication relationship for the at least one storage object of the first storage node and the at least one storage object of the second storage node and guarantees that any subsequent asynchronous replication relationship's update or resync transfer will detect a file system inconsistency between the baseline transfer between the primary storage site and the secondary storage site and the AFS contents.

Example 43 includes the subject matter of any of Examples 41-43, further comprising: converting from the synchronous replication relationship to an asynchronous relationship from the at least one storage object of the first storage node to the at least one storage object of the second storage node; and initiating an asynchronous resynchronous workflow from the at least one storage object of the first storage node to the at least one storage object of the second storage node.

Example 44 includes the subject matter of any of Examples 41-43, further comprising: detecting AFS divergence when AFS contents are different than the baseline transfer; performing a restore operation to remove file system inconsistencies due to the AFS divergence; and performing asynchronous transfers from the at least one storage object of the first storage node to the at least one storage object of the second storage node.

Example 45 includes the subject matter of any of Examples 41-44, wherein the AFS UUID can be a multibit value to uniquely identify the storage object.

Example 46 includes the subject matter of any of Examples 41-45, wherein assigning the new active file system (AFS) version universal unique identifier (UUID) to the at least one storage object of the second storage node after resuming processing of I/O operations reduces the resumption time of processing of input/output (I/O) operations during the common snapshot process.

Example 47 is a distributed storage system having a primary storage site with a first storage node and a secondary storage site with a second storage node comprising: a processing resource; and a non-transitory computer-readable medium coupled to the processing resource, having stored therein instructions, which when executed by the processing resource cause the processing resource to: initiate a synchronous replication process for a file system including starting a synchronous data replication lifecycle for replicating data from a first storage object of a first storage node of the first storage site to a second storage object of a second storage node of second storage site; perform baseline and asynchronous data transfers from the first storage object to the second storage object including a baseline transfer that creates a snapshot copy of the first storage object volume and transfers the snapshot copy to the second storage object; asynchronously transferring new snapshot copies from the first storage object to the second storage object; and add a transient tag to a snapshot tag meta file for the first storage object of the first storage node and optionally also for the second storage object of the second storage node to grow the snapshot tag meta file during the synchronous replication process before fencing input/output (I/O) operations for the first storage object and the second storage object during a snapshot create request.

Example 48 includes the subject matter of Examples 47, wherein the instructions when executed by the processing resource cause the processing resource to: perform, the snapshot create request with aggregate affinity and thus fully utilize multithreading of processing resources in the file system.

Example 49 includes the subject matter of any of Examples 47-48, wherein adding the transient tag to a snapshot tag meta file for the first storage object of the first storage node and optionally also for the second storage object of the second storage node during the synchronous replication process before fencing I/O operations moves serial operations in the file system out of a client I/O hold window.

Example 50 includes the subject matter of any of Examples 47-49, wherein the instructions when executed by the processing resource cause the processing resource to: set a sync replication bit for the first storage object of the first storage node and also for the second storage object.

Example 51 includes the subject matter of any of Examples 47-50, wherein the instructions when executed by the processing resource cause the processing resource to: remove the transient tag from the snapshot tag meta file if a common snapshot for the snapshot create request occurs during a configurable time period.

Example 52 includes the subject matter of any of Examples 47-51, wherein the instructions when executed by the processing resource cause the processing resource to:

store the transient tag in the snapshot tag meta file if a common snapshot for the snapshot create request did not occur during a configurable time period.

Example 53 includes the subject matter of any of Examples 47-52, wherein the instructions when executed by the processing resource cause the processing resource to: establish an insync state to indicate a synchronous replication for a data replication relationship between the first storage object and the second storage object.

Example 54 is a non-transitory computer-readable storage medium embodying a set of instructions, which when executed by a processing resource of a first storage node cause the processing resource to: initiate a synchronous replication process for a file system including starting a synchronous data replication lifecycle for replicating data from a first storage object of the first storage node of a first storage site to a second storage object of a second storage node of second storage site; perform baseline and asynchronous data transfers from the first storage object to the second storage object including a baseline transfer that creates a snapshot copy of the first storage object volume and transfers the snapshot copy to the second storage object; asynchronously transfer new snapshot copies from the first storage object to the second storage object; and add a transient tag to a snapshot tag meta file for the first storage object of the first storage node and optionally also for the second storage object of the second storage node to grow the snapshot tag meta file during the synchronous replication process before fencing input/output (I/O) operations for the first storage object and the second storage object during a snapshot create request.

Example 55 includes the subject matter of Example 54, wherein the instructions when executed by the processing resource cause the processing resource to: perform, the snapshot create request with aggregate affinity and thus fully utilize multithreading of processing resources in the file system.

Example 56 includes the subject matter of any of Examples 54-55, wherein adding the transient tag to a snapshot tag meta file for the first storage object of the first storage node and optionally also for the second storage object of the second storage node during the synchronous replication process before fencing I/O operations moves serial operations in the file system out of a client I/O hold window.

Example 57 includes the subject matter of any of Examples 54-56, wherein the instructions when executed by the processing resource cause the processing resource to: set a sync replication bit for the first storage object of the first storage node and also for the second storage object.

Example 58 includes the subject matter of any of Examples 54-57, wherein the instructions when executed by the processing resource cause the processing resource to: remove the transient tag from the snapshot tag meta file if a common snapshot for the snapshot create request occurs during a configurable time period.

Example 59 includes the subject matter of any of Examples 54-58, wherein the instructions when executed by the processing resource cause the processing resource to store the transient tag in the snapshot tag meta file if a common snapshot for the snapshot create request did not occur during a configurable time period.

Example 60 includes the subject matter of any of Examples 54-59, wherein the instructions when executed by the processing resource cause the processing resource to: establish an insync state to indicate a synchronous replication for a data replication relationship between the first storage object and the second storage object.

What is claimed is:

1. A computer-implemented method for reducing a resumption time of processing of input/output (I/O) operations during a common snapshot process performed by one or more processors of a multi-site distributed storage system with a primary storage site having a first storage node and a secondary storage site having a second storage node, the computer-implemented method comprising:
   initiating a snapshot multi create operation to selectively form a batch of first and second synchronous replicated datasets each having storage objects that belong to a first group of storage disks at the primary storage site and corresponding second group of storage disks at the secondary storage site;
   performing a batch snapshot create operation on the primary storage site by executing snapshots of storage objects on the primary storage site of the batch of first and second synchronous replicated datasets in parallel multiple threads to utilize processing resources on the primary storage site; and
   initiating an independent workflow and state machine for each storage object of the batch of first and second synchronous replicated datasets.

2. The computer-implemented method of claim 1, further comprising:
   starting a drain and hold state for the primary storage site to stop processing of I/O operations and start queuing incoming write operations, and to complete pending write operations received before the drain and hold state; and
   subsequent to the drain and hold state, the batch snapshot create operation is performed on the primary storage site for each storage object of the batch and sending the batch snapshot create operation to the secondary storage site to be performed on each storage object of the batch of the secondary storage site in parallel multiple threads to utilize processing resources on the secondary storage site, wherein the first replicated dataset of the batch has a synchronous replication relationship between a first storage object of the primary storage site and a replicated second storage object of the secondary storage site.

3. The computer-implemented method of claim 1, further comprising:
   tracking pending operations of the primary storage site.

4. The computer-implemented method of claim 2, wherein the batch snapshot create operation causes creation of a snapshot of the first storage object and a snapshot of the replicated second storage object of the first synchronous replicated dataset.

5. The computer-implemented method of claim 1, wherein the batch snapshot create operation causes creation of a snapshot of a third storage object and a snapshot of a replicated fourth storage object of the second synchronous replicated dataset.

6. The computer-implemented method of claim 1, wherein the snapshot multi create operation indicates a batch identifier and a number of storage objects in one or more storage nodes of the batch.

7. The computer-implemented method of claim 1, further comprising: upon successful completion of the batch snapshot create operation, queued ops are allowed to continue splitting for the first storage node and the second storage node.

8. A multi-site distributed storage system having a primary storage site with a first cluster and a secondary storage site with a second cluster comprising:
  one or more processing resources; and
  a non-transitory computer-readable medium coupled to the processing resource, having stored therein instructions, which when executed by the one or more processing resources cause the one or more processing resources to:
  initiate a snapshot multi create operation to selectively form a batch of first and second synchronous replicated datasets each having storage objects that belong to a first group of storage disks at the primary storage site and corresponding second group of storage disks at the secondary storage site;
  perform a batch snapshot create operation on the primary storage site by executing snapshots of storage objects on the primary storage site of the batch of first and second synchronous replicated datasets in parallel multiple threads to utilize processing resources on the primary storage site; and
  initiate an independent workflow and state machine for each storage object of the batch of first and second synchronous replicated datasets.

9. The multi-site distributed storage system of claim 8, wherein the instructions when executed by the one or more processing resources cause the one or more processing resources to:
  starting a drain and hold state for the primary storage site to stop processing of I/O operations and start queuing incoming write operations, and to complete pending write operations received before the drain and hold state; and
  subsequent to the drain and hold state, the batch snapshot create operation is performed on the primary storage site for each storage object of the batch and sending the batch snapshot create operation to the secondary storage site to be performed on each storage object of the batch of the secondary storage site in parallel multiple threads to utilize processing resources on the secondary storage site, wherein the first replicated dataset of the batch has a synchronous replication relationship between a first storage object of the primary storage site and a replicated second storage object of the secondary storage site.

10. The multi-site distributed storage system of claim 8, wherein the instructions when executed by the one or more processing resources cause the one or more processing resources to:
  tracking pending operations of the primary storage site.

11. The multi-site distributed storage system of claim 2, wherein the batch snapshot create operation causes creation of a snapshot of the first storage object and a snapshot of the replicated second storage object of the first synchronous replicated dataset.

12. The multi-site distributed storage system of claim 8, wherein the batch snapshot create operation causes creation of a snapshot of a third storage object and a snapshot of a replicated fourth storage object of the second synchronous replicated dataset.

13. The multi-site distributed storage system of claim 8, wherein the snapshot multi create operation indicates a batch identifier and a number of storage objects in one or more storage nodes of the batch.

14. The multi-site distributed storage system of claim 8, wherein the instructions when executed by the one or more processing resources cause the one or more processing resources to:
  upon successful completion of the batch snapshot create operation, continue splitting queued ops.

15. A non-transitory computer-readable storage medium embodying a set of instructions, which when executed by one or more processing resources of a storage node cause the one or more processing resources to:
  initiate a snapshot multi create operation to selectively form a batch of first and second synchronous replicated datasets each having storage objects that belong to a first group of storage disks at the storage node of a primary storage site and corresponding second group of storage disks at a secondary storage site;
  perform a batch snapshot create operation on the primary storage site by executing snapshots of storage objects on the primary storage site of the batch of first and second synchronous replicated datasets in parallel multiple threads to utilize processing resources on the primary storage site; and
  initiate an independent workflow and state machine for each storage object of the batch of first and second synchronous replicated datasets.

16. The non-transitory computer-readable storage medium of claim 15, wherein the instructions when executed by the one or more processing resources cause the one or more processing resources to:
  start a drain and hold state for the primary storage site to stop processing of I/O operations and start queuing incoming write operations, and to complete pending write operations received before the drain and hold state; and
  subsequent to the drain and hold state, the batch snapshot create operation is performed on the primary storage site for each storage object of the batch and sending the batch snapshot create operation to the secondary storage site to be performed on each storage object of the batch of the secondary storage site in parallel multiple threads to utilize processing resources on the secondary storage site, wherein the first replicated dataset of the batch has a synchronous replication relationship between a first storage object of the primary storage site and a replicated second storage object of the secondary storage site.

17. The non-transitory computer-readable storage medium of claim 15, wherein the instructions when executed by the one or more processing resources cause the one or more processing resources to:
  tracking pending operations of the primary storage site.

18. The non-transitory computer-readable storage medium of claim 16, wherein the batch snapshot create operation causes creation of a snapshot of the first storage object and a snapshot of the replicated second storage object of the first synchronous replicated dataset.

19. The non-transitory computer-readable storage medium of claim 15, wherein the batch snapshot create operation causes creation of a snapshot of a third storage object and a snapshot of a replicated fourth storage object of the second synchronous replicated dataset.

20. The non-transitory computer-readable storage medium of claim 15, wherein the snapshot multi create operation indicates a batch identifier and a number of storage objects in one or more storage nodes of the batch.

* * * * *